United States Patent
Testa et al.

(10) Patent No.: US 10,050,711 B2
(45) Date of Patent: Aug. 14, 2018

(54) OPTICAL TRANSPORT NETWORK

(71) Applicant: Telefonaktiebolaget LM Ericsson (publ), Stockholm (SE)

(72) Inventors: Francesco Testa, Pisa (IT); Giulio Bottari, Pisa (IT); Fabio Cavaliere, Pisa (IT); Paola Iovanna, Pisa (IT); Jacob Österling, Stockholm (SE); Marzio Puleri, Pisa (IT); Roberto Sabella, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 5 days.

(21) Appl. No.: 15/325,312

(22) PCT Filed: Jul. 11, 2014

(86) PCT No.: PCT/EP2014/064988
§ 371 (c)(1),
(2) Date: Jan. 10, 2017

(87) PCT Pub. No.: WO2016/005008
PCT Pub. Date: Jan. 14, 2016

(65) Prior Publication Data
US 2017/0163342 A1    Jun. 8, 2017

(51) Int. Cl.
*H04B 10/2575* (2013.01)
*H04J 3/16* (2006.01)
*H04Q 11/00* (2006.01)

(52) U.S. Cl.
CPC ...... *H04B 10/25753* (2013.01); *H04J 3/1652* (2013.01); *H04Q 11/0003* (2013.01); *H04Q 11/0005* (2013.01)

(58) Field of Classification Search
None
See application file for complete search history.

(56) References Cited

U.S. PATENT DOCUMENTS

| 7,493,129 B1* | 2/2009 | Mostafa | H04W 56/0045 455/502 |
| 2003/0081286 A1* | 5/2003 | Tei | G02B 6/29367 398/82 |

(Continued)

FOREIGN PATENT DOCUMENTS

| WO | 2008022018 A2 | 2/2008 |
| WO | 2015032424 A1 | 3/2015 |
| WO | 2015176764 A1 | 11/2015 |

OTHER PUBLICATIONS

Chang, Gee-Kung et al., "Architecture and Applications of a Versatile Small-Cell, Multi-Service Cloud Radio Access Network Using Radio-over-Fiber Technologies", 2013 IEEE International Conference on Communications Workshops (ICC), Jun. 9-13, 2013, 879-883.

(Continued)

*Primary Examiner* — Andrew Lai
*Assistant Examiner* — Jamaal R Henson
(74) *Attorney, Agent, or Firm* — Sage Patent Group

(57) ABSTRACT

A transport network (10) is configured to connect a plurality of remote radio units (3) with a plurality of digital units (5) in a radio access network. The transport network comprises an electronic cross-connect (31) common to the plurality of remote radio units and digital units, and a control unit (32) configured to control the electronic cross-connect. The transport network further comprises an optical link (40) between the electronic cross-connect and remote radio units. The electronic cross-connect is a multi-layer switch. The electronic cross-connect is configured to switch data flows between one or more of said plurality of digital units (5) and one or more of said plurality of remote radio units (3).

37 Claims, 11 Drawing Sheets

(56) References Cited

U.S. PATENT DOCUMENTS

| | | | |
|---|---|---|---|
| 2010/0255855 A1* | 10/2010 | Sabat, Jr. | H04W 16/14 |
| | | | 455/450 |
| 2010/0278530 A1* | 11/2010 | Kummetz | H04W 88/085 |
| | | | 398/41 |
| 2011/0135013 A1* | 6/2011 | Wegener | H03M 7/40 |
| | | | 375/241 |
| 2013/0121248 A1 | 5/2013 | Lee et al. | |
| 2013/0136068 A1 | 5/2013 | Johansson et al. | |

OTHER PUBLICATIONS

Liu, Cheng et al., "The Case for Re-configurable Backhaul in Cloud-RAN based Small Cell Networks", 2013 Proceedings IEEE Infocom, Apr. 14-19, 2013, 1124-1132.

Zhu, Fei et al., "100G OTN Technology and Deployment for Carrier Networks", 2012 Optical Fiber Communication Conference and Exposition and the National Fiber Optic Engineers Conference(OFC/NFOEC), Jan. 2012, 1-3.

\* cited by examiner

OPTICAL TRANSPORT NETWORK

TECHNICAL FIELD

Embodiments herein relate to an optical fronthaul transport network, switch for an optical fronthaul network and a method for operating an optical fronthaul transport network.

BACKGROUND

In today's radio transport networks a number of different technologies are used, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A radio transport network comprises Radio Base Stations (RBS) providing radio coverage over at least one respective geographical area forming a cell. The cell definition may also incorporate frequency bands used for transmissions, which means that two different cells may cover the same geographical area but using different frequency bands. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

In some RBS implementations a radio unit and a baseband processing equipment (digital unit (DU)) of the RBS are separated. In some examples, the radio unit and baseband processing equipment is split in two different locations. In this case, the radio unit is remote and termed a remote radio unit (RRU). As such, the system separates a RBS into one or more DU and RRUs.

The DU and RRU are connected via e.g. an optical network. The one or more DUs may be centralized and located remotely, for example a few kilometers from the RRUs. The RRUs are placed close to the radio antennas, e.g. in antenna masts. This minimizes feeder and jumper losses between antenna and RRUs, which is often a major challenge to address in most radio transport networks, for example, to enhance the uplink capacity of mobile services. The signal processing is centralized in a DU, which offers processing resources for multiple cells, each covered by an antenna driven by a RRU. This allows a pool of processing resources to be dynamically shared among many cells, in line with the cloud computing principle, saving energy, improving the radio link reliability and decreasing number and size of access sites.

In systems such as Long Term Evolution (LTE) and LTE Advanced (LTE-A), where coordinated processing is essential to performance improvements, the capability to manage this centrally rather than via an external X2 interface between base stations could generate important performance gains.

In addition, collaborative processing is essential to reduce and manage inter-cell interference between neighboring cells and across access layers in heterogeneous networks where small cells are used to offload part of the traffic originally handled by a macro cell. Here coordination is essential to avoid interference and to enable frequency reuse among macro and small cells.

In some examples, the interface between the DUs and RRUs is an optical Non-Return to Zero (NRZ) signal, which is a sampled In-phase Quadrature (I/Q) air interface waveform. Sampling the air waveform makes the remote radio unit implementation relatively simple but leads to very high bitrates of the optical signal, in the order of 1.25 Gbps per antenna.

A Common Public Radio Interface (CPRI) specifies a Time Division Multiplexing (TDM) like protocol for RBS configurations in a system configured for RRUs and DUs over a first layer. CPRI defines a protocol which is used to connect a DU and RRU. The application of CPRI between the DUs and the RRUs is static, i.e. determined as the RBS is deployed, and its configuration is only changed as part of a predetermined topology involving the DUs and RRUs.

CPRI requires accurate synchronization and latency control. Even if conventional CPRI transport is normally operated on fiber using point-to-point optical connections between DU and RRU distant less than a few hundreds of meters, there is a demand to extend its reach over geographical distances.

Traditional dedicated point to point links established between a limited number of DU ports and associated RRUs is inadequate to meet these new extended distance requirement. For example, the need of new installed fibers would be not sustainable as soon as the distances between RRU and associated digital unit became longer than a few kilometers.

Moreover, an increase of the optimization level could be achieved by having a pool of DUs serving a plurality of RRUs. This allows a wider geographical area, enabling a higher optimization of computational resources. The use of a pool of DUs must deal with at least the following issues:

CPRI has tight requirements and constrains (e.g. latency, jitter, symmetry). A transport and switching solution shall comply with them.

Efficient load balancing and failure recovery require the ability to change which DU(s) is handling an RRU, possibly without traffic disruption.

A consistent reduction of infrastructure cost requires optimizing the geographical cabling which supports the connectivity among RRU and DU.

SUMMARY

In a first aspect of the invention, there is provided a transport network configured to connect a plurality of remote radio units with a plurality of digital units in a radio access network. The transport network comprising an electronic cross-connect common to the plurality of remote radio units and digital units, and a control unit configured to control the electronic cross-connect. The transport network further comprises an optical link between the electronic cross-connect and remote radio units. The electronic cross-connect is a multi-layer switch. The electronic cross-connect is configured to switch data flows between one or more of said plurality of digital units and one or more of said plurality of remote radio units.

In a second aspect of the invention, there is provided a method for operating a transport network configured to connect a plurality of remote radio units with a plurality of digital units in a radio access network, comprising controlling an electronic cross-connect common to the plurality of remote radio units and digital units. The method further comprises transmitting data flows on an optical link between the electronic cross-connect and remote radio units. The electronic cross-connect is a multi-layer switch. The electronic cross-connect switches data flows between one or more of said plurality of digital units and one or more of said plurality of remote radio units.

In a third aspect of the invention, there is provided a transport network configured to connect a plurality of remote radio units with a plurality of digital units in a radio access network, and configured to change a connection of a said remote radio unit from an original one of the digital units to a target one of the digital units. The electronic cross-connect is configured to multicast a data flow from a said remote radio unit to the original one of the digital units and the target one of the digital units. The target digital unit is configured to align frames with the original digital unit. When alignment has been completed, the switch is configured to discontinue communication between the original digital unit and the remote radio unit.

In a fourth aspect of the invention, there is provided a method for operating a transport network configured to connect a plurality of remote radio units with a plurality of digital units in a radio access network, comprising changing a connection of a remote radio unit from an original digital unit to a target digital unit. The method comprises an electronic cross-connect multicasting a data flow from the remote radio unit to the original digital unit and the target digital unit, and aligning frames of the target digital unit with the original digital unit. The method further comprises, when alignment has been completed, discontinuing communication between the original digital unit and the remote radio unit.

In a fifth aspect of the invention, there is provided a system in a radio access network comprising: a plurality of remote radio units, a plurality of digital units, and a transport network connecting the plurality of remote radio units and plurality of digital units as claimed in any example.

In a sixth aspect of the invention, there is provided an electronic cross-connect configured to connect a plurality of remote radio units with a plurality of digital units in a radio access network. The electronic cross-connect is a multi-layer switch, and the electronic cross-connect is configured to switch data flows between one or more of said plurality of digital units and one or more of said plurality of remote radio units.

In a seventh aspect of the invention, there is provided a computer program product configured to implement the method of any example of the invention.

BRIEF DESCRIPTION OF THE DRAWINGS

Embodiments will now be described by way of example only in relation to the enclosed drawings, in which.

DETAILED DESCRIPTION

Figure 1:
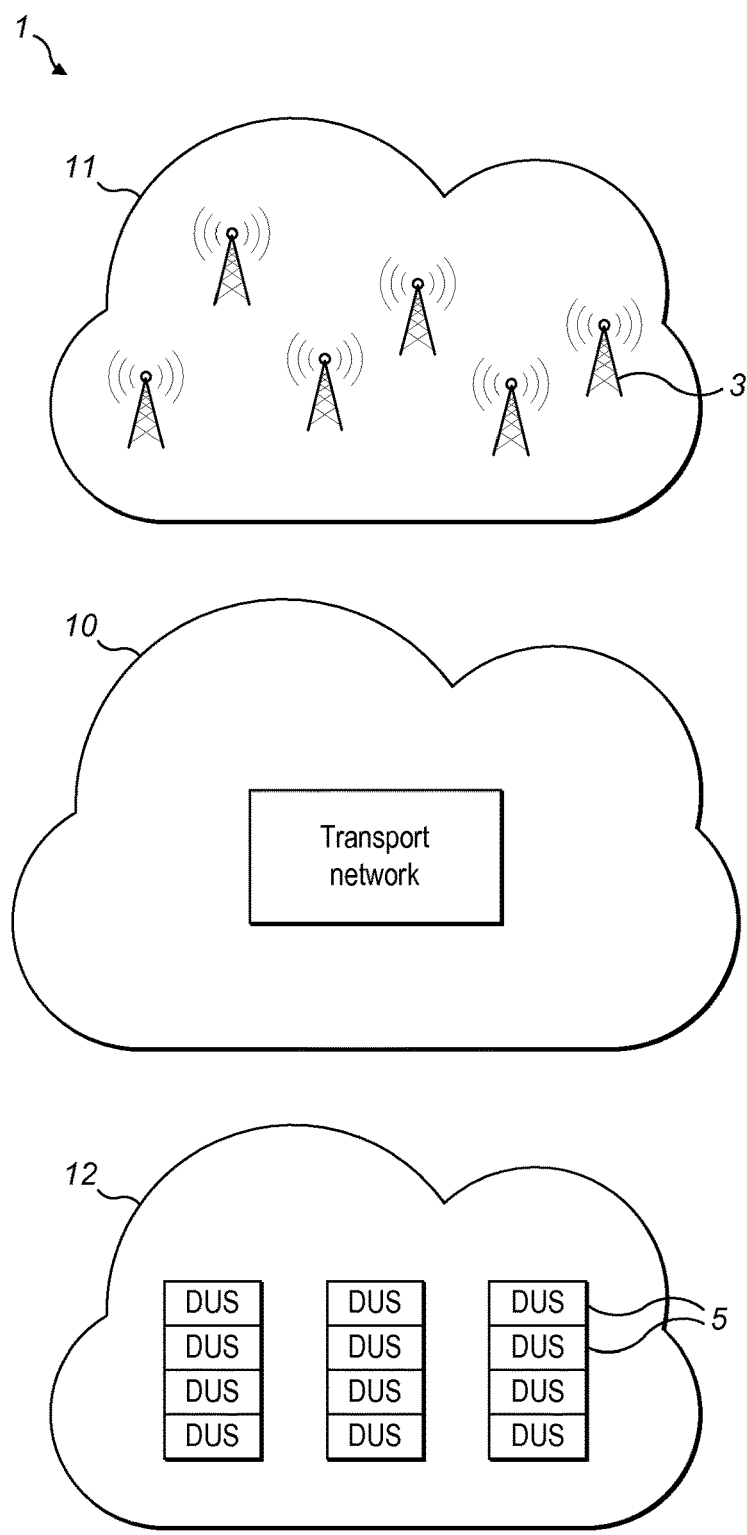
FIG. 1 is a schematic overview depicting a system according to an example of the invention.

FIG. 1 is a schematic overview of a network 1 having remote radio units 3 and digital units 5. The network is compliant with a number of radio access technologies such as LTE, LTE-Advanced, WCDMA, GSM/EDGE, WiMax, or UMB, to mention a few possible implementations. The network comprises RBSs that are separated into the RRUs 3 and DUs 5. The network 1 comprises a transport network 10 to provide reconfigurable connectivity among RRUs and DUs. The transport network 10 includes optical and electrical switches and multiplexers/demultiplexers, fiber links, and a control unit.

In some examples, the RRU may alternatively be termed Radio Equipment (RE). In some examples, the DU may alternatively be termed a Main unit (MU), Radio Equipment Controller (REC) or Baseband Unit (BBU).

The RRUs 3 are considered as located in a RRU cloud 11, comprising a plurality of RRUs 3. The DUs 5 are considered as located in a DU cloud 12, comprising a plurality of DUs 5.

The RRUs 3 are connected with the DUs 5 via a transport network 10. The transport network 10 is configured to connect a selected RRU 3 with a selected DUS. In some examples, the transport network 10 allows a connection to be selected between any one of the DUs and any one of the RRUs. The RRUs 3 and DUs 5 are in general not co-located, but are sited in different locations. In some examples, at least some of the RRUs 3 are clustered together and/or at least some of the DUs 5 are pooled together.

In some examples, the transport network 10 may be considered as an Optical and CPRI cross-connect. The transport network 10 may be considered as connecting the RRU cloud 11 with the DU cloud 12. The transport network 10 provides for distributing and allocating an amount of baseband resources in DUs 5 to each of a set of radio units 3 located in a geographical area.

Aspects of the invention relate to dynamically connecting, over a geographical area, a set of RRUs, optionally grouped in clusters, with at least one DU of a pool of DUs. This provides for optimizing the allocation of the overall baseband processing capability via DU pooling and of minimizing power consumption. Aspects of the invention also provide for re-configurability and scalability. The method and relevant transport network described in more detail below provides an efficient RRU-DU communication, via optical transport and switching, of CPRI flows, over geographical distances.

Figure 2:
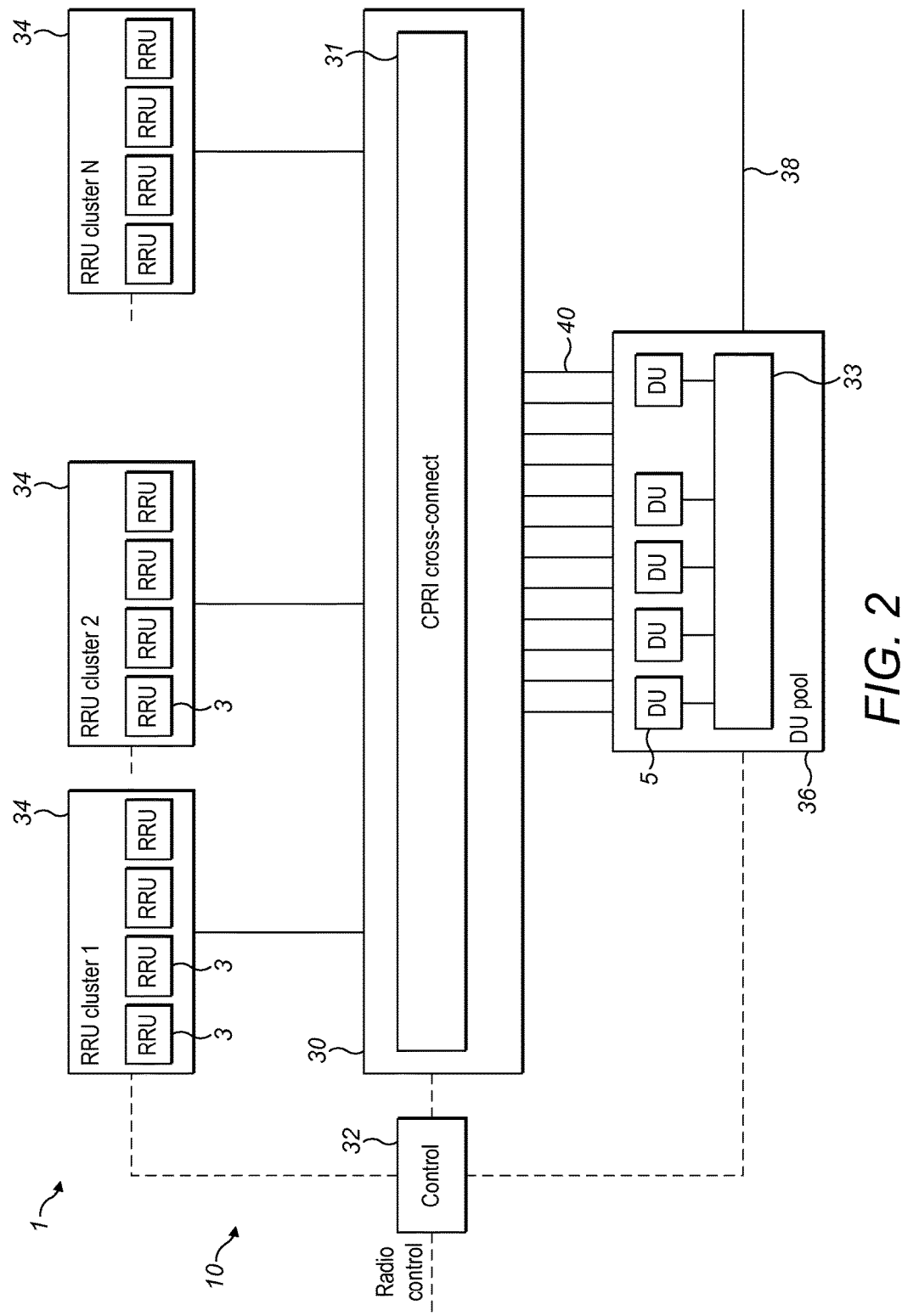
FIG. 2 is a general schematic overview depicting a system according to the invention.

FIG. 2 shows an example of a system 1 comprising a transport network 10 connecting a plurality of RRUs 3 with a pool of DUs 5.

The plurality of RRUs 3 are arranged in one or more RRU clusters 34. In this example, the plurality of RRUs are arranged in a plurality of RRU clusters 34. Each RRU cluster 34 comprises a plurality of RRUs 3.

The plurality of DUs are arranged in one or more DU pool 36. Each DU pool 36 comprises a plurality of DUs 5. In this example, there is a single DU pool 36.

In some examples, the DUs are connected to each other by a switch 33. The switch 33 provides for local interconnection of DUs. The switch 33 may be co-located with the DU pool. For example, the switch 33 is an Ethernet switch. The transport network 10 is configured with the ability to change which DU processes the traffic coming from a given RRU. This reduces, or makes unnecessary, the inter-DU communication. The transport network may not include a switch 33 providing for local interconnection of DUs.

The DU pool 36 is connected to a core network (not shown) by a backhaul connection 38. The transport network 10 between the RRUs 3 and DUs 5 comprises a central hub 30. The central hub 30 is connected between the RRUs and DUs. The central hub 30 may be geographically separate to the RRUs and DUs, or co-located, e.g. with the DUs.

The central hub 30 comprises an electronic cross-connect 31. The electronic cross-connect 31 is configured to cross-connect, i.e. switch, data between the RRUs and DUs. In some examples, the data is transported according to an interface standard, for example CPRI. As such, the electronic cross-connect 31 is a CPRI electronic cross-connect.

User plane data is transported in the form of IQ data. Several IQ data flows are sent via one physical CPRI link. Each IQ data flow reflects the data of one antenna for one carrier, the so-called antenna-carrier (AxC). Each RRU may receive and send multiple AxC sub-flows.

In some examples, the central hub 30 is configured to provide for switching at a plurality of different granularities. In particular, the electronic cross-connect 31 may be operated at different granularities, for example, down to the AxC level. In some examples, the electronic cross-connect 31 is able to switch received data at one or more level or layer, as described in more detail below.

The transport network 10 comprises a hub based architecture, e.g. based on the central hub 30. The arrangement provides a full decoupling of a RRU clusters from the specific DU of the pool, thus facilitating efficient pooling operations. The hub 30 is a centralized (re-)configuration point, acting at different granularities. The hub 30 concentrates a larger part of operational costs in a single node.

The connection between the central hub 30 and RRU cloud 11 (RRU clusters 34) is an optical connection. In some examples, the connection between the central hub 30 and DU cloud 12 (DU pool 36) is an optical connection. The RRU cloud 11 and DU cloud 12 may be considered as connected by an optical network.

Optical signals are converted into the electrical domain at the hub 30. Original CPRI flows, optionally "opened" down e.g. to the AxC granularity, are then switched by the CPRI cross-connect 31 included in the hub 30. By switching such flows it is possible to direct the radio signal of each RRU or RRU cluster to the desired DU or DU pool 36 for baseband processing purposes.

The transport network 10 comprises optical links and systems 40 to connect RRUs to the hub 30 and the hub 30 to DUs. The optical links and systems are shown at a high level as connecting the central hub 30 to each of the RRUs and DUs. Further details are described below. In some examples, the transport network 10 comprises multiplexing/switching modules, located at a RRU cluster side of the transport network 10 and/or DU side of the transport network 10, and described below.

In some examples, the multiplexing/switching modules allocate and groom multiple CPRI flows in a single optical channel for communication with the hub 30. In some examples, the multiplexing/switching modules are configured to time division multiplex (TDM) data flows relating to a plurality of RRUs and/or DUs on a same optical channel. The optical channel may be provided by an optical signal, e.g. a particular wavelength in a WDM system, or a grey optical signal in a fibre whose wavelength is not strictly defined.

The optical links to transport data, e.g. between each RRU cluster 34 and DU pool 36 and the central hub 30 may be optical fibres. The optical links used may provide WDM transport, e.g. DWDM. Alternatively, the optical links provide for grey optical signal transport. In this example, the grey wavelength is within a large wavelength range, but is not strictly defined within that range.

In one example, the optical signals are carried over DWDM wavelengths at 2.5 Gbit/s or 10 Gbit/s. However, aspects of the invention may utilize one or more different technologies (for example: grey or WDM transmitters, pluggable or parallel optics, fixed or reconfigurable multiplexer) and granularities.

A control unit 32 is configured to control the entire transport network to operate according to the method and to recover traffic from failures. The control unit 32 controls the central hub and any part of the transport network 10, e.g. switching at the RRU clusters 34 and one or more DU pool 36.

In some examples, the control unit 32 operates autonomously and/or triggered by inputs from an external radio control or management triggers. The control unit 32 owns and maintains the CPRI network in the WDM network. The control unit 32 determines configuration and reconfiguration at different level of granularities. For example, the configuration may be determined based on a AxC granularity to a lambda granularity. The ability of the control unit to configure the switch based on a consideration of a plurality of granularities may optimize the use of the resources.

The control unit 32 is configured to control the switch based on available resources in a plurality of layers. In particular, the control unit 32 is configured to control the switch to combine wavelengths (lambda granularity), and to combine CPRI flows, e.g. at 2.5G (CPRI granularity) and/or AxC sub-flows (AxC granularity). The control unit may therefore optimise resources at a plurality of these levels, such that the transport network is efficiently utilized, for example, across a plurality of wavelengths and/or within an optical channel (across time slots).

A data flow (e.g. AxC) may be switched by the multi-layer switch to change the output relative to other (e.g. AxC) flows, to change the larger unit of data flow (e.g. 2.5G) containing that flow (e.g. AxC), or to change the optical channel on which that data flow is transmitted to a RRU or DU. For example, the cross-connect may switch the received data flow onto a particular output to be part of a larger granularity (e.g. CPRI and/or lambda), the larger granularity layer being determined by the control unit. For example, the control unit may locate a AxC or CPRI data flow within a particular (larger) CPRI flow or lambda to efficiently make use of the available transport capacity. The control unit is configured to control the cross-connect dynamically, according to the current conditions. As such, the electronic cross-connect may be considered to switch at multiple layers (multi-layer switch).

The multi-layer switch is able to switch data at a plurality of different layers or granularity levels. This provides for the cross-connect to change an input to an output at a plurality of different layers. For example, the input is included in an output which is controlled at a plurality of different layers (e.g. lambda, CPRI, AxC) of the cross-connect; the output at each of the plurality of different layers being controlled by the multi-layer cross-connect. The plurality of different layers may refer to any two or more of the layers or granularities, e.g. two or more of AxC, CPRI (including any data rate, e.g. 2.5G, 10G), SAP (described below), or lambda (wavelength) granularity.

For example, the control unit 32 optimises the network connecting a DU and a RRU cluster, or connecting DUs.

The control unit 32 is configured to drive all the switches involved in the connection provisioning, at the different supported granularities (e.g. CPRI, optical) in order to provide an optimized grooming and routing of CPRI flows over optical signals. The control unit 32 can handle dynamic recovery at different layers according to the supported switching granularity. The control unit 32 function is to control the switches at the different supported granularities. In some examples, the granularity may be configured from SAP (service access point) to lambda.

In an example of switching at SAP granularity, control and synchronization information are switched in addition to data units. According to the CPRI specifications for all protocol data planes, layer 2 SAPs are used as reference points for performance measurements. These service access points are denoted as $SAP_{CM}$, $SAP_S$ and $SAP_{IQ}$. A service access point is defined on a per link basis. In this example, SAPx is the basic entity that can be controlled/handled.

The control unit 32 may receive inputs from external radio control/management entities (e.g. OSS), for example, to enforce policies and rules devoted to DU power consumption optimization and load balancing. The control unit 32 also activates recovery schemes at different granularities in response to link failures or hub failure, for example as described.

Figure 3:
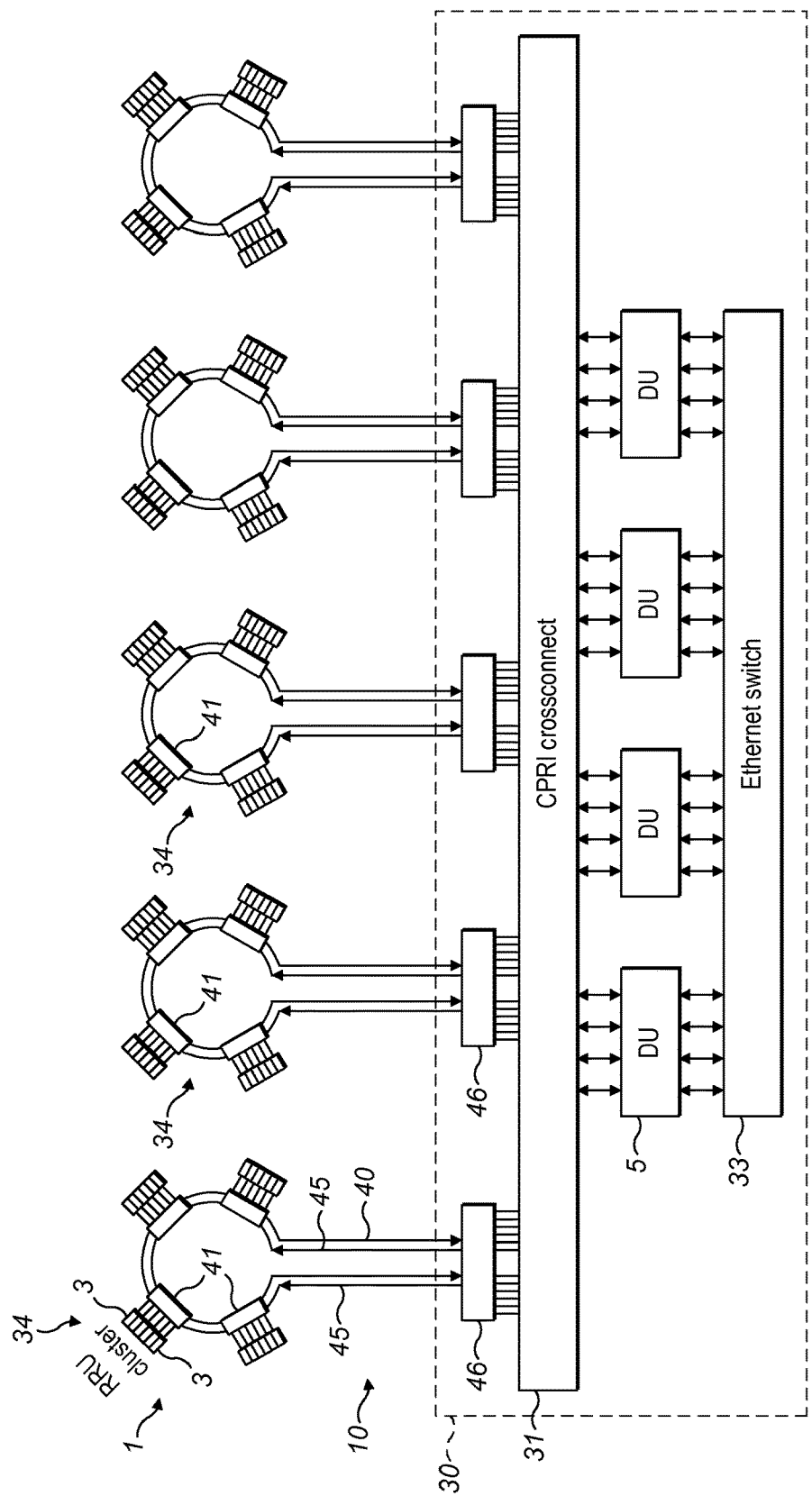
FIG. 3 is a schematic overview depicting a system according to the invention detailing the optical networking.

FIG. 3 shows an example of part of a system 1 and transport network 10. The control unit connected to the DU pools and RRU clusters is not shown. For optical transport, data flows between the RRUs and central hub 30 are multiplexed within a wavelength and/or different wavelengths are multiplexed together.

As previously described, the central hub 30 operates optical-electrical conversion for ingoing signals and electrical-optical conversion for outgoing signals. One or more electro-optical converters (not shown) are at outputs of the electronic cross-connect 31. Optical outputs from the electronic cross-connect 31 are arranged to be transported over optical connections to the RRUs and DUs. The cross-connect 31 may be a multi-layer switch as described, or may operate only at a single layer.

Each RRU cluster has an independent optical network connection. This provides for wavelength re-use between each RRU cluster. As such, there is no conflict between using the same wavelengths to carry data flows between the cross-connect and RRUs of different RRU clusters 34.

The RRU clusters 34 comprise one or more multiplexer/demultiplexer 41. The multiplexer/demultiplexer 41 is configured to WDM multiplex/demultiplex optical signals to/from the cross-connect 31. Data flows from a plurality of RRUs are wavelength multiplexed/demultiplexed by the optical multiplexer/demultiplexer 41. The multiplexer/demultiplexer 41 is configured to demultiplex optical channels received from the cross-connect 31, and WDM multiplex optical channels for transport to the cross-connect. As such, the multiplexer/demultiplexer 41 and multiplexer/demultiplexer 46 provide for WDM multiplexed transport between the cross-connect 31 and RRU clusters 34.

In this example, the multiplexer/demultiplexer 41 connecting the RRUs to the transport network 10 has the function of an optical add/drop multiplexer. The optical add/drop multiplexer may be fixed or reconfigurable. In some examples, the optical multiplexer/demultiplexer 41 is connected to a plurality of RRUs, and is configured to selectively carry out optical multiplexing for the connected RRUs. The multiplexer/demultiplexer 41 is configured to multiplex data flows, for example by wavelength multiplexing, with data flows from other RRUs in the cluster. The plurality of wavelengths are on a single fiber. In some examples, one or more of the plurality of wavelengths carries a 10 Gbit/s signal. The plurality of wavelengths may originate from, or be destined for, one or more RRU clusters.

In some examples, a plurality of RRU clusters 34 is connected to the central hub 30 using the same one or more optical fibers. The wavelengths and/or CPRI flows corresponding to each RRU cluster are extracted from/inserted into the common optical fiber at each RRU cluster by the multiplexer/demultiplexer 41. In some examples, a RRU cluster corresponds to an antenna site. In this example, the transport network is multiplexing WDM data flows for different RRUs and RRU clusters, e.g. different antenna sites. This network arrangement is independent of any other feature, e.g. independent of electrical multiplexing within an optical wavelength.

The hub 30 comprises one or more optical multiplexer/demultiplexer 46 configured to WDM multiplex/demultiplex signals to/from the RRUs. The transport network is configured to transport the optical signals through a single optical fiber.

This arrangement enables the use of the electronic cross-connect 31, with benefits in terms of costs and flexibility with respect to all optical switching architectures. The cross-connection granularity depends on the implementation choice. In some examples, a smallest granularity of the cross-connection depends on the implementation choice, or may be dynamically configured.

In some examples, the RRUs are connected to the central hub 30 on one or more ring 45 of optical fiber. A plurality of RRU clusters 34 may be connected together, for example, arranged on a common optical ring. In some examples, the RRUs are connected with the central hub 30 via two optical rings 45. In some examples, two rings 45 carry signals in opposite directions to/from the central hub 30. A plurality of multiplexer/demultiplexers 41 are connected to the ring 45, each extracting and demultiplexing, and adding and multiplexing data flows, for one or more associated RRUs. The optical multiplexer/demultiplexer 41 connects the RRUs to the rings. The rings 45 transport the optically multiplexed signal over a geographical distance to the central hub 30.

Each multiplexer 41, e.g. functioning as an OADM, is associated with a set of a plurality of RRUs, e.g. four RRUs. The multiplexer/demultiplexer 41 is configured to drop one or more wavelengths from the ring to the RRUs. Data flows from the associated RRUs are added to the wavelengths on the ring.

In some examples, the multiplexer/demultiplexer 41, 46 is configured to multiplex/demultiplex at a sub-wavelength level. In this case, data flows from/for a plurality of RRUs or DUs are multiplexed on a single optical channel, e.g. WDM wavelength. The multiplexer/demultiplexer 41 functions as a sub-wavelength switching module, configured to switch data flows to particular RRUs. The multiplexer/demultiplexer 41 is located at the RRU cluster side, to allocate and groom multiple CPRI flows in a single optical channel (e.g. wavelength) towards the remotely located hub.

One or more multiplexer/demultiplexer 41 is configured to multiplex a plurality of optical wavelengths for transport over the optical link towards the electronic cross-connect, wherein the plurality of wavelengths are associated with one or more remote radio units. In some examples, the multiplexer/demultiplexer is an optical add-drop multiplexer, wherein the optical add-drop multiplexer is configured to add or drop optical wavelengths associated with one or more connected remote radio units.

Within each RRU cluster 34, data flows from one or more RRUs are multiplexed together by the multiplexer/demultiplexer 41, by multiplexing within a wavelength or by multiplexing wavelengths. In some examples, data flows from a plurality of multiplexer/demultiplexer 41 (i.e. a plurality of RRU clusters) are multiplexed together. For example, this multiplexing is by multiplexing wavelengths (i.e. WDM). Multiplexing within a wavelength is also or alternatively possible in some examples.

In some examples, the multiplexer/demultiplexer 41 has different sections: an electronic multiplexer/demultiplexer section and an optical multiplexer/demultiplexer section. The electronic and optical sections may be present together or only one present, depending on implementation.

The electrical multiplexer/demultiplexer manages CPRI flows, from the different RRUs, within a single optical channel that is transmitted from/to the central hub. The transmission is over a point-to-point link or through an optical ring network. In the case of an optical ring network, WDM signals are transported and the use of an optical multiplexer/demultiplexer provides the benefit of a higher fiber utilization and higher level of resiliency. The transport network optical link between the electronic cross-connect and remote radio units comprises a ring to which one or more remote radio units are connected.

In some examples, the data flows from two or more RRUs is not electrically combined by the multiplexer/demultiplexer 41, 46 into a common optical channel (wavelength). In some cases, each RRU has its own optical channel (wavelength). The wavelengths from a plurality of RRUs are wavelength division multiplexed, e.g. by multiplexers 41,46.

In some examples, data flows from the electronic cross-connect 31, for example towards the RRUs, is aggregated within an optical channel by the electronic cross-connect 31. The electronic cross-connect 31 is configured to function as a multiplexer and aggregate the data flows relating to different RRUs within an optical channel.

The data flows from RRUs, connected to a particular multiplexer, and those data flows from other RRUs and multiplexers, are transported to/from the central hub. Each cluster has an independent optical connection to the central hub. This provides for wavelength reuse among different RRU clusters.

The access rings 45 provide for protection in the event of failure. The rings 45 provide for failure recovery implicit to ring protection. This reduces the service outage in case of failure.

In this example, a plurality of DUs are co-located with the hub. DUs are also connected via the switch 33 for local data exchange. Co-location of DUs is not an essential part of the invention, and the DUs may be separated from the central hub 30 and connected, for example, with an optical connection. In some aspects of the invention, the system comprises a plurality of DU pools. In this example, only a single DU pool comprising a plurality of DUs is shown.

In some examples, encapsulation of CPRI flows inside a frame, includes forward error correction (FEC) capabilities and operation and maintenance (OAM) information. This provides robustness and synchronization control of CPRI over optical connections.

In aspects of the invention, it is possible to dynamically change the DU which processes the RRU traffic. The change of processing DU may be carried out in two different ways:

1) "Cold": the dynamic re-association between a RRU and DUs is done when the RRU is not operative. For example, this may occur for a small cell (RRU) which is temporary switched off and the relevant traffic is handled by an associated macro cell (i.e. another RRU).
2) "Hot": the dynamic re-association between a RRU and DUs is done when the RRU is in operation. CPRI synchronization must be preserved during reconfiguration.

A re-association between a RRU and DU(s) can be pre-planned or un-predicted. For example, the re-association may be driven by traffic forecasts, traffic measurements or other triggers.

The dynamic RRU-DU re-association, while the RRU is operative (i.e. "hot swap") needs a suitable and continuous alignment of the signal between the RRU and the DU. This implementation may be independent of any other features described. This example may be implemented in a system as shown in any one of FIGS. 1 to 6*c*. This implementation does not require all the features described in other examples, for example, does not require a multi-layer switch.

Figure 7:
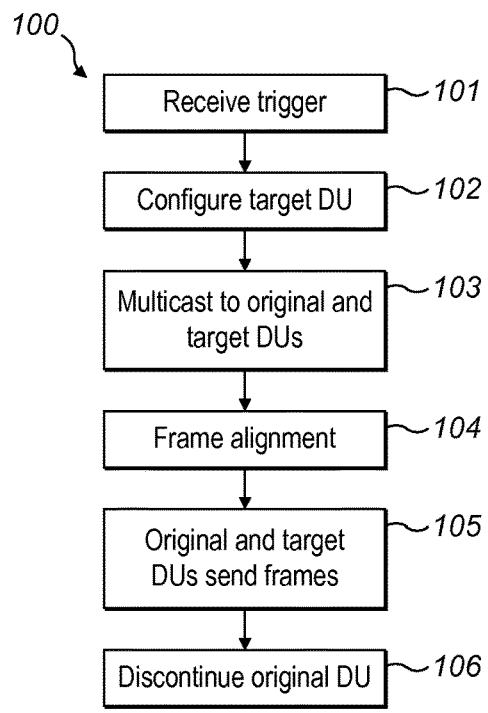
FIG. 7 is a schematic flowchart illustrating an example method of an aspect of the invention.

The features described with respect to FIG. 7 utilize a system 1 comprising a RRU cloud 11 connected to a DU pool or cloud 12 by a CPRI switch, e.g. CPRI switch 31. The CPRI switch is under the control of a control unit 32. Whatever the switching function of the transport protocol (e.g. CPRI switch) is implemented, a method is required to ensure that such alignment is kept when the signal is moved from the original DU to a target DU. The currently connected DU will be referred to as the original DU, and the intended DU which will take over processing will be referred to as the target DU.

These features are applicable to switching by the cross-connect 31 at a coarse granularity (CPRI switching) and/or to AxC switching.

The protocol switching function (e.g. CPRI switch 31) is configured to implement multicasting of signals towards the original DU and the target DU, at the same time. The multicasting is in an uplink direction, i.e. from the RRU towards the DUs. The protocol switching function is configured to provide a frame position alignment for signals transmitted towards the RRUs 3.

FIG. 7 describes a method 100 of dynamic re-configuration, i.e. hot swap. In 101, the control unit 32 receives a trigger to move an RRU 3 from one DU 5 to another DU 5 (target DU).

For example, the trigger may be based on a monitoring of the status of DU. In some examples, the trigger is due to the DU being switched off for energy saving. Alternatively, the trigger for re-configuration may be based on signaling from the Mobility Management Entity (MME), or any other trigger to change the associated DU.

In 102, the control unit 32 sends a signal to the target DU that an operative RRU will be connected. The target DU is put at "pre-alignment" status. The control unit 32 configures the target DU with the information about the current connection to be served.

In 103, the control unit 32 configures the protocol switching function and the network 10 in order to send the protocol switching function signal from the RRU concurrently to the original DU and the target DU. As such, the protocol switching function signal is multicast to both the original DU and the target DU in a transitional period. For example, the multicasting is provided by the cross-connect (switch) 31. The transitional period ends when original DU discontinues communication.

In 104, the target DU carries out a frame alignment. As a part of frame alignment, the original DU and target DU use the same time slot(s) for the data flow(s). RRU and DU recognize which are the slots addressed to them according to their positions in the frame. The new DU sends a signal to the control unit 32 to confirm that the target DU is aligned and ready. The target DU may be considered to be in hot stand-by.

In some examples, the original and target DUs do not have the same time slots available. In this case, the switch re-maps the time slots in order to keep the original time slot positioning for the RRU.

In 105, in some examples the original and target DU send their frames to the switch 31. In some aspects, this allows the switch 31 to monitor the frame alignment of the target DU, during the transitional period.

The frame of the target DU is aligned with the original DU frame at the switch 31. The switch 31 sends the data flows only from the original DU until the alignment process is completed.

In 106, the communication between the original DU and RRU is stopped under the control of the control unit. As soon as the alignment is established the target DU informs the control unit that it is operative, and the original DU may discontinue, e.g. be switched off.

In some examples, the control unit 32 configures the electrical switch 33 (e.g. an Ethernet switch) to send the traffic received by backhaul to the original and the target DUs, and send the traffic to the backhaul from the original DU.

In the case that the original and target DDUs have different identifiers (ID) e.g. IP address, the ID of the target DU is communicated to the backhaul network control to allow set up the correct data and control communication channels.

Some aspects of the invention provide a transport network configured to connect a plurality of RRUs with a plurality of DUs in a radio access network. The transport network comprises an electronic cross-connect or switch connecting the plurality of RRUs and DUs. The transport network is configured to change a connection of a RRU from an original DU to a target DU. The switch is configured to multicast a data flow from the RRU to the original DU and the target DU. The target DU is configured to align frames with the original DU. When alignment has been completed, the switch is configured such that communication between the original DU and the RRU is discontinued.

In this case, only the target DU (and not the original DU) continues communication with the RRU. This provides the hot swap operation.

Optionally, the switch is configured to re-map a time slot of a data flow, such that the data flow received by the RRU from the original and target DU are in the same time slot.

Optionally, the original DU and target DU are configured to send frames to the electronic cross-connect, during the transitional period.

Some aspects of the invention provide a method in a radio access network of changing a connection of a RRU from an original DU to a target DU, the method comprising an electronic cross-connect multicasting a data flow from the RRU to the original DU and the target DU. The method further comprises aligning frames of the target DU with the original DU. The method further comprises, when alignment has been completed, discontinuing communication between the original DU and the RRU.

Optionally, the electronic cross-connect re-maps a time slot of a data flow, such that the data flow received by the RRU from the original and target DU are in the same time slot. Optionally, the original DU and target DU send frames to the electronic cross-connect, during the transitional period.

The electronic cross-connect of the above and any example may be a multi-layer switch (e.g. lambda to AxC) or may operate at only a single layer (e.g. AxC or CPRI).

Aspects of the invention provide for radio and control data to be transported among RRUs and DUs, with the ability to re-configure the association between RRUs and DU(s) where and when appropriate.

The Control Unit (CU) 32 has one or more of the following functions or capabilities:
  Awareness of the status (e.g. switched on/off) of each DU,
  Ability to switch on/off each DU.
  Awareness of the baseband processing (residual) capability of each DU (e.g. by continuous monitoring).
  Ability to drive the switch(es) involved in RRU-DU communication.
  Ability to receive external triggers (i.e. from radio control).
  Awareness of status of processing resource (e.g. by continuous monitoring).
  Awareness of the status (e.g. up, down, occupancy) of the transport resource (links, switches, etc.).
  Ability to apply optimization functions according to a particular policy. For example, the policy may be configured by an operator. For example, one or more DU in the DU cluster can be included or excluded from the procedure as described according to operator policy.
  Ability to optimize the transport resource usage (i.e. optical and CPRI). The control unit is configured to concurrently consider all switching and aggregation points in the system. The control unit 32 has the capability to selectively aggregate data flows of RRUs to be transported on a same wavelength (lambda). The control unit 32 optimization may be based on one or more factors, for example, network status, resource availability and policy.

The following example functionalities are enabled by aspects of the invention:
New RRU Activation and Baseband Processing Allocation Aspects of the invention provide for the functionality connecting a new RRU to the network 10.

The control unit 32 has the following functions, and may carry out the following steps. In some examples, the control unit 32 is operating in cooperation with the radio control. When a new RRU is introduced in the network, the control unit 32 is notified by the radio control/management. The control unit is in charge of selecting and configuring the required networking resources, including the optical channels and the involved DU(s). In some examples, the selection of one or more DU(s) is received as an input from the radio control/management.

The control unit 32 estimates the amount of baseband resources to be allocated to the new RRU. The control unit 32 determines the CPRI bandwidth requirements. The control unit 32 determines if the required bandwidth is available on any of the existing optical channels. If the bandwidth is available, the RRU is served by that optical channel, by multiplexing its CPRI flow to the one already framed in the optical channel. The control unit 32 is configured to multiplex a plurality of data flows, e.g. from different RRUs, on the same wavelength. In this case, the control unit 32 determines if an optical channel (e.g. wavelength) has a spare availability to carry a data flow for the new RRU. If so, the control unit 32 configures the multiplexer/switch to include data flows from the new RRU with data flows from existing RRUs.

The control unit 32 is arranged to identify the single DU or multiple DUs of the pool which can provide the required baseband processing. The control unit 32 triggers the switch to connect the RRU with the identified DU(s).

In aspects of the invention, the RRUs, when connected, are assigned sufficient resources (e.g. one or more optical channel, wavelength, or a part of wavelength), and then the control unit awaits or determines a DU which has capacity to connect to the RRU. The control unit is configured to program the CPRI switch 31 to map these services from the DU port to the intended RRU port.

If new RRUs are attached in a WDM optical ring, a reconfiguration of existing wavelength could be required. Possibly, the new RRUs could be multiplexed in existing CPRI flows with no need of wavelength reconfiguration.

In some examples, transport and switching of data flows between a RRU and DU may operate at different granularities. The granularity is controlled by the control unit 32. For example, the granularity may be down to AxC. Further details of examples of the implementation are described below.

Load Balancing Via DU Pooling

Aspects of the invention relate to the functionality of load balancing. The load balancing provides for splitting the baseband processing effort among a plurality of cooperating DUs of a pool of DUs. An RRU may be connected to multiple DUs. The amount of processing of each DU can be changed and optimized overtime.

The control unit 32 may have the following functions. These functions or steps are optionally in cooperation with the Radio Control. The control unit 32 is in charge of estimating the amount of baseband resources to be allocated to each RRU. In some examples, the control unit 32 estimates, for each digital unit, the available baseband resources as multiples of a given granularity (e.g. AxC or 2.5 Gbit/s).

In some aspects, the control unit 32 maps the baseband processing needs of each RRU to one or more of the DUs, according to their resource availability at a particular granularity. The given granularity is configured to trigger the switch to connect the RRU with the identified DU(s).

The function of load balancing may be triggered or driven by one or more events. For example, the load balancing may be initiated or re-evaluated after a DU is switched off. This may provide a better distribution of the processing workload among the available DU resources.

Energy Saving Via Switching Off DUs

Aspects of the invention relate to the functionality of energy saving. This functionality refers to the ability to save energy by switching off one or more DUs without traffic disruption. The control unit 32 may have the following functions or take the following steps. In some examples, the control unit 32 identifies a DU with the minimum workload, or a workload below a threshold level. For a DU with the minimum workload, the control unit 32 determines that this workload is below a threshold and may enter into an energy saving mode (e.g. being switched off). In some examples, the threshold for returning to a normal energy mode (e.g. switching on) is at a higher value. This avoids instability.

In some examples, the control unit 32 is configured to determine the available baseband resources at the required granularity, available at one or more other DUs. A comparison is made between the available resources and the workload of the identified DU (i.e. the DU identified as having the minimum workload). Based on this comparison, the control unit 32 may determine if the workload of the identified DU can be re-allocated among the other DUs.

If the control unit 32 determines that the workload can be distributed to other DUs, the workload is migrated by triggering the switch 10 to connect the RRUs to the DUs identified at the previous step.

After migration of the workload, the control unit 32 is arranged to put the identified one or more DU(s) in an energy saving mode, e.g. switch off of the DU(s) which has no further traffic to handle.

Dynamic Link Failure Recovery

Aspects of the invention relate to the functionality of dynamic link failure recovery. This functionality involves re-allocating baseband processing from a DU to another DU. In this example, the re-allocation is triggered by a fault notification received by the control unit 32. In some examples, the central hub is arranged to communicate the fault notification to the control unit 32. The control unit 32 is configured to determine one or more DU(s) to which the baseband processing can be moved.

As described above for re-allocation due to energy saving, the control unit 32 determines which DUs have available baseband resources at the required granularity. The workload of the DU(s) identified with the fault is then re-allocated to those one or more DUs having available baseband resources.

In aspects of the invention, recovery schemes are configured to protect the system from single failure. Recovery schemes are dependent on the particular topology used in interconnecting the RRUs (clusters) to the hub and DUs to the hub. They also depend on node arrangement and on the used technologies.

The following types of single faults may be recovered by aspects of the invention:

1). A fiber break between RRU and hub or between hub and DU.

In some examples an interconnection of the DUs or RRUs with the hub is based on point to point grey optical line. This example is shown for DUs in FIG. 2. In order to recover a fiber break in such a point to point grey optical line, the optical lines must be duplicated. Protection switching is accomplished by electrical switches in the DU and RRU, or external optical switches and optical combiners are used on each fiber link. In the former case the system is also protected against transceiver fault.

2) In some examples, an interconnection of the DUs or RRUs with the hub is based on WDM rings. This example is shown for RRUs in FIG. 3. In the event of link failure, the transmission direction in the double fiber ring is inverted to avoid the link failure. In some examples, optical add-drop multiplexers are used (e.g. integrated Mini-ROADMs). This allows the protection switching to be accomplished completely inside the multiplexer node without the need of interface/link duplication. This is enabled by the capability of the optical add-drop multiplexers (e.g. Mini-ROADM) to integrate switching optical function, for protection purposes, at low cost and small footprint.

In some examples, fixed optical add-drop multiplexers (FOADMs) are used in each node. The FOADMs are duplicated and protection switching is accomplished by external optical switches and optical combiners. In some examples each node, including the central hub 30, is configured to detect a fault and autonomously take the recovery actions. This scheme can be implemented in different ways depending on the node optical technology.

3) Fault of the central hub node. In some examples, single points of failure of the devices in the central hub 30, e.g. transceivers and switches, are duplicated.

Figure 4:
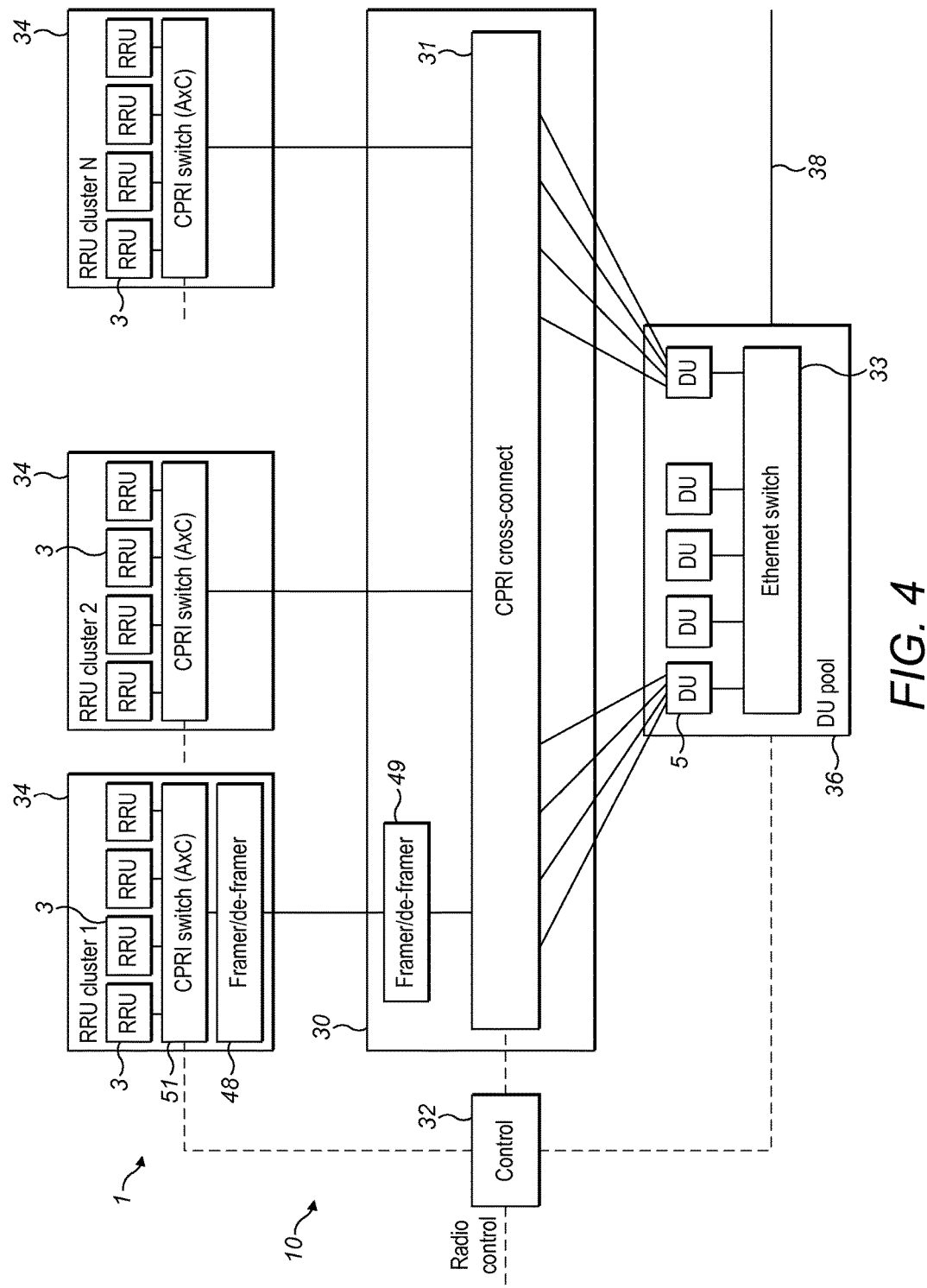
FIG. 4 is a schematic overview depicting a system according to a further example of the invention.

FIG. 4 illustrates an example of the invention, based on a single Antenna-Carrier (AxC) cross-connect 31 in the hub. In this example, the cross-connect 31 is switching at AxC granularity as the base level. The switching is with a single cross-connect. Each AxC data flow may be switched independently, for example to different DUs. Each AxC flow relates to the data of one carrier at one independent antenna element. Multiple AxCs are multiplexed in a CPRI line bit rates, for example, at 1228.8 Mbit/s, 2457.6 Mbit/s, 9830.4 Mbit/s. Other line rates may be used. The cross-connect 31 may be a multi-layer switch as described, or may operate only at a single layer.

RRU data flows can be sent through the optical channels to the central hub 30 either individually or after a pre-aggregation.

In some examples, data flows from a plurality of RRUs are aggregated by a switch 51, e.g. CPRI switch 51. In this case, a cluster 34 of RRUs 3 can share a single optical channel towards the hub 30. The switch 51 is configured to aggregate data flows from the plurality of connected RRUs for transmission on a single optical channel. The switch 51 has a granularity which may be fixed or reconfigurable. In some examples, the granularity of an output of the switch 51 is AxC towards the cross-connect 31.

For data flows from a RRU to a DU, the switch 51 is configured to receive a CPRI flow from each of the plurality of connected RRUs. For example, the CPRI flow is at 2.5 Gbps. The switch 51 is configured to aggregate AxC blocks into high rate CPRI flows (e.g. 10 Gbps). The switch 51 carries out switching, receiving a CPRI signal at a first rate (e.g. 2.5 Gbps) CPRI flow, terminating AxC sub-flows and multiplexing and reassembling the received signals into a second, higher rate (e.g. 10 Gbps). The aggregation may be within an optical channel, and/or across a plurality of optical channels (WDM). The switch 51 is controlled by the control unit 32.

In some examples, a framer/de-framer 48 is configured to frame/de-frame CPRI data flows at the RRU cluster 34. The framer/de-framer 48 is configured to add a forward error correction (FEC) code and O&M data. FEC functionality may be used where the power budget limits the distance reach under the required distance. This framer/deframer 48 is designed to have a limited impact on latency (<4 μs). In some examples, encapsulation may be used to enrich the flow with an Operation & Maintenance (O&M) channel. The framer/de-framer 48 is optional, and may not be included in the transport network.

The framer/de-framer 48 is configured to assemble a frame by adding FEC and overhead for O&M for transport to the central hub. The framer/de-framer 48 may correspondingly remove the FEC and overhead for a signal received from the central hub.

In some examples, the data flows may be additionally optically aggregated at the clusters 34 before transmission to the hub 30, for example, as described with respect to FIG. 3 as WDM aggregation.

A corresponding framer/de-framer 49 is located in the central hub. The framer/de-framer 49 is configured to frame the data flows for transport to the RRU cluster switch 51, and de-frame the data flows before transfer to the cross-connect 31.

The hub 30 is in charge of terminating the optical channels and of electronically cross-connecting CPRI flows down to the AxC granularity. The cross-connect 31 sends CPRI flows to the DUs 5, e.g. at 10 Gbit/s.

In this example, the cross-connect 31 and transport network 10 operates at AxC granularity. This allows data flows at AxC to be generated by the RRUs and independently switched to the DUs. The AxC are aggregated at the RRU clusters prior to optical transmission to the central hub 30. The aggregation may be within an optical channel, and/or across a plurality of optical channels (WDM).

The CPRI cross connect 31 aggregates AxC blocks into CPRI flows (e.g. at a high rate, for example 10 Gbps), for transmission to the DUs.

As previously described, the DUs are locally connected via a dedicated switch, if needed. However, their interconnection (e.g. by IDLe) are not needed for DU pooling, since this operation may be done at the hub level. For example, the cross-connect 31 is able to concentrate traffic at AxC level towards a selected DU 5. Dedicated cabling among DUs are thus optional. In some examples, a master DU is connected to the backhaul network towards the core network, via the Ethernet switch 33.

For data flows from the DUs to the RRUs, the optical transport described operates in reverse. The CPRI cross connect 31 multiplexes the AxC blocks received from the DU into e.g. 10G CPRI signals. The CPRI switch 51 at the RRU site disassembles the AxC blocks, switch and reassemble them onto CPRI signals (e.g. 2.5G) to be sent to individual RRUs.

The CPRI switch 51 is configured to terminate the AxC sub-flows (or blocks) received from the central hub, e.g. as 10G CPRI. The switch 51 is configured to switch the AxC sub-flows and reassemble the sub-flows onto a CPRI signal (e.g. at 2.5 Gbps) to be delivered to individual RRUs. Other high and low rate combinations are possible. The switch 51 is configured to terminate the sub-flows at the granularity switched by the central cross-connect 31 (AxC), and reassemble the sub-flows into a different granularity or form of signal between the switch 51 at the RRU cluster and the RRUs.

The switch 51 is configured to terminate AxC sub-flows received from the electronic cross-connect over the optical ink. The switch 51 is configured to reassemble the sub-flows onto a signal to be delivered to individual ones of the plurality of RRUs.

In this example, an aggregated CPRI flow is sent through an optical channel at 10 Gbit/s. This aggregated CPRI flow may be on a single optical channel. As such, the data flows are within a wavelength. The optical channel carrying CPRI data flows relating to a plurality of RRUs or DUs may be wavelength division multiplexed with other optical channels, in this case they have to be wavelength coded.

The transport from the RRU cluster is over a geographical distance, towards the central hub, reducing the geographical cabling compared to separate optical connections (fibers) for each RRU. Higher concentration levels of data flows are possible when each 2.5 Gbit/s CPRI flow from RRUs is not completely filled.

The use of WDM multiplexing can be exploited for the connection of RRUs with the central hub and/or for the connection of the central hub with the DUs.

The multiplexing may be an electrical multiplexing. This provides for a plurality of data flows (e.g. from a plurality of RRUs) to be carried on a single optical channel. The electrical multiplexing may be at a plurality of different levels, e.g. AxC or at CPRI-2.5 Gbps. The electrical multiplexer is connected to a plurality of RRUs. As such, the transport network 10 comprises an electrical switch at the RRU site, in communication with the separate cross-connect 31.

Aspects of the invention relate to aggregation and switching of CPRI flows at the RRU clusters 34, coupled with the switching operated centrally at the hub 30. This allows reducing cabling required to connect the hub with the RRUs and with the DUs.

Figure 5:
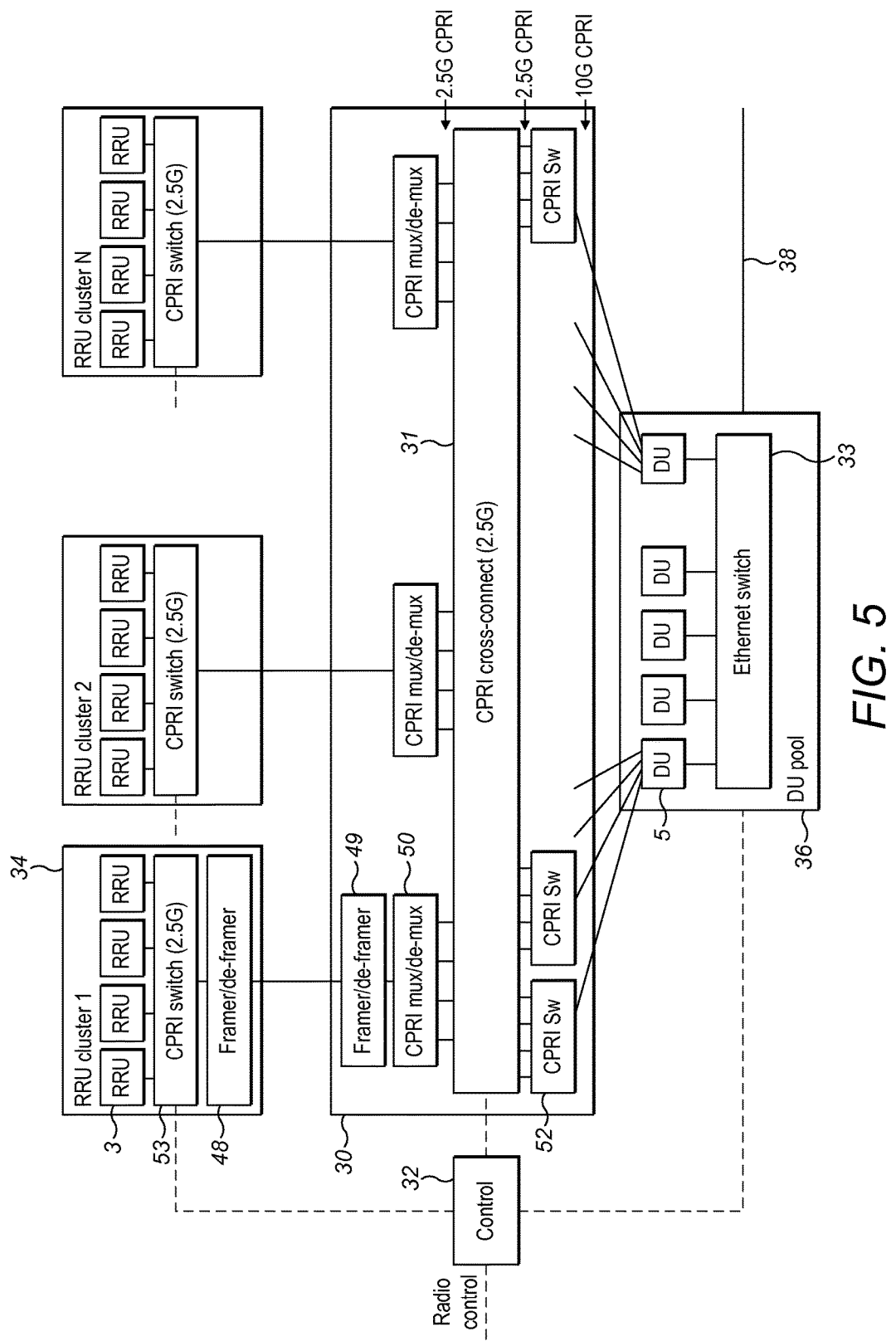
FIG. 5 is a schematic overview depicting a system according to a further example of the invention.

FIG. 5 shows a further implementation option of the transport network 10. In this example, the central hub 30 comprises a cross-connect 31 operating at a particular granularity. The granularity may be at a line bit rate of the protocol, e.g. CPRI. In some examples, the switching granularity of the cross-connect is 2.5 Gbit/s, in an alternative example, the switching granularity of the cross-connect is lower, e.g. AxC granularity. The electronic cross-connect is configured to directly switch transported CPRI flows. The electronic cross-connect is configured to switch without terminating AxC sub-flows. The cross-connect 31 may be a multi-layer switch as described, or may operate only at a single layer.

The RRU clusters 34 comprise a switch 53 configured to aggregate CPRI flows towards the central hub 30. In some examples, the switch 53 is configured to switch flows at a same granularity from/towards the RRUs as the flows are switched by the electronic cross connect of the central hub, e.g. 2.5 Gbps.

In FIG. 5, the switch 53 does not perform a termination of AxC sub flows. The switch 53 is configured to switch only CPRI containers (e.g. at 2.5 Gbps). The CPRI containers are also switched by the electronic cross-connect 31. A plurality of CPRI containers are assembled in a frame (e.g. at 10 Gbps) used for transport between the switch 53 at the RRU clusters and the central hub. The frame (e.g. at 10 Gbps) used for transport between the switch 53 at the RRU clusters and the central hub may be a proprietary frame. The frame (e.g. at 10 Gbps) used for transport between the switch 53 at the RRUs is not a 10G CPRI frame in structure, although it is carrying CPRI signals e.g. at 10 Gbps. At the RRU cluster site, the CPRI switch 53 transmits and receives a signal comprising a plurality of CPRI containers, e.g. at 2.5 Gbps.

For a received signal, the CPRI switch 53 is configured to disassemble the received signal (frame), for example four containers at 2.5 Gpbs from a 10 Gbps transport signal), and switch the containers to RRUs 3.

In some examples, RRUs data flows are sent through the optical channels after a pre-aggregation achieved by a CPRI switch 53 and framing by a framer/de-framer 48, as previously described. In some examples, the framer/de-framer 48 is integrated with the CPRI switch module 53. The CPRI multiplexer 53 is configured to group a plurality of CPRI flows on a single optical channel (i.e. wavelength). For example, the CPRI multiplexer 53 is configured to aggregate four CPRI flows at 2.5 Gbit/s in a proprietary 10 Gbit/s signal, which is then sent through an optical channel at 10 Gbit/s, over a geographical distance, towards the hub 30. In some examples, the maximum concentration ratio is 4:1.

In this example, unused AxC slots in the 2.5 Gbit/s CPRI data flows cannot be used to host IQ data related to further co-located and connected RRUs, for example, connected in a star topology.

In some examples, the framer/de-framer 48 can optionally be used to add FEC functionality. FEC functionality may be used where the power budget limits the distance reach under the required distance. Framer can also be used when an additional O&M channel is required. The framer/de-framer 48 is optional, and may not be included in the transport network.

The central hub 30 further comprises the framer/deframer 49, corresponding to the framer/deframer 48 at the RRU side.

The central hub 30 further comprises one or more CPRI multiplexer/demultiplexer 50. The multiplexer/demultiplexer 50 is configured to disassemble the received optical transport frame received from the RRUs, and at lower rates (e.g. 2.5G) and assemble them in a higher rate signal (e.g. 10 Gbit/s), for transport of the data flows towards the RRUs. In some examples, the central hub comprises one multiplexer/demultiplexer 50 for each RRU cluster 34. The multiplexer/demultiplexer 50 outputs to the cross-connect a CPRI rate which may be switched by the cross-connect 31.

The multiplexer/demultiplexer 50, and switch 53, do not terminate the AxC sub-flows. Termination of the AxC sub-flows would be expected in a conventional multiplexer/demultiplexer converting between two CPRI rates, e.g. 2.5G and 10G. However, multiplexer/demultiplexer 50 do not generate a higher rate signal by terminating AxC sub-flows from a plurality of lower rate signals, and re-assembling them into the CPRI standard format for the higher rate signal. Instead, the multiplexer/demultiplexer 50 aggregates a received plurality of lower rate signals without modifying the lower rate signal structure.

The lower rate signals (e.g. 2.5G) may be considered as containers. The containers are electronically assembled into a higher rate frame without the data contents (AxC sub-flows) of the containers being re-arranged or modified. The function of the multiplexer/demultiplexer 50, and switch 53, is therefore different to a conventional CPRI device which terminates the AxC sub-flows in the containers, and generates an entirely new higher rate signal from the AxC sub-flows.

As such, the optical transport of the higher rate signal (e.g. at 10G) in examples of the present invention is based on the transport of an aggregation of containers of a plurality of lower rate signals, without modification to the containers or terminating sub-flows and re-arranging sub-flows received in those containers. The multiplexer/demultiplexer 50, and switch 53, are configured to aggregate a plurality of lower rate signals by maintaining an arrangement of data (arrangement of AxC sub-flows) within each lower rate signal.

The electronic cross-connect is configured to directly switch transported CPRI flows. The electronic cross-connect is configured to switch without terminating AxC sub-flows.

In some examples, the central hub is based on a cross-connect at 2.5 Gbit/s. As such, the received data flows are switched between RRUs and DUs at a 2.5 Gbit/s granularity, although other rates may be used. In some examples there is a strict relation, in the architecture of FIG. 5, between the CPRI flows handled by the RRUs, and the granularity of the CPRI cross connect.

The central hub 30 further comprises one or more CPRI switches 52. The CPRI switches 52 are configured to receive CPRI flows from the cross-connect 31 at the switching granularity. The CPRI switches 52 are configured to terminate the AxC blocks in the flows. The CPRI switches 52 generate a higher rate CPRI flow towards the DUs. For example, a CPRI switch 52 receives four 2.5 Gbps flows from the cross-connect 31, and generates a 10 Gbps CPRI flow to a DU 5. This 10 Gbps CPRI flow is a standard CPRI data flow, unlike the proprietary 10 Gbps flow between the RRUs and cross-connect 31.

The central hub 31 comprises one or more CPRI switches 52 operating at AxC level. The CPRI switches 52 terminates and switches the AxC blocks in the 2.5G CPRI and construct a 10G CPRI flow transmitted to the DU over an optical channel. If the DUs have ports operating at the same granularity as the cross-connect 31, the use of AxC blocks by the switches 52 are not needed. In this case, termination of AxC sub-flows is not required, and the DUs can be connected directly to the cross-connect 31.

The switch/multiplexer 50,53 is configured to generate a plurality of flows at a granularity which is switched by the electronic cross-connect, e.g. 2.5 Gbps. For a 10 Gbps received flow from a RRU, the switch/multiplexer 50,53 generates 4×2.5G CPRI flows. Different higher and lower rates combinations are possible.

The CPRI cross connect 31 of FIG. 5 does not terminate AxC sub flows but only switches the CPRI flows (e.g. 2.5G CPRI flows) received at the input. In some examples, the cross-connect 31 spatially switches the flows.

The CPRI multiplexer/demultiplexer 50 and framer 49 assemble a plurality of CPRI containers at the switched granularity into a higher rate frame. For example, 10G. The multiplexer/demultiplexer (50) configured to communicate across the optical link with the remote radio units and/or switch (53) configured to communicate across the optical link with the electronic cross-connect are configured to aggregate a plurality of lower rate signals by maintaining an arrangement of data within each lower rate signal and/or without terminating AxC sub-flows.

The CPRI multiplexer/demultiplexer 50 and framer 49 assemble four 2.5G CPRI containers onto a frame to be transmitted over the optical network. As previously mentioned, at the RRU cluster site, the CPRI switch 53 receives as input the signal with the CPRI containers (e.g. four containers each of 2.5 Gbps), disassembles them and switches them to RRUs.

In the example of FIG. 5, the flexibility in combining IQ data from one DU with IQ data from another DU is lower than the example of FIG. 4. This is because, in FIG. 4 full flexibility is allowed, i.e. switching at AxC granularity.

In some examples, a 2.5 Gbit/s granularity is sufficient for DU pooling. In this case, a DU-DU connection to exchange AxC slots between the DUs is not required. If a lower granularity is required, a partial DU-DU cabling may optionally be included. This allows combining IQ data between DUs not connected to the same CPRI switch 52.

The CPRI switch 52 is only able to switch AxC blocks, received from the CPRI input (e.g. at 10 Gbps) from a DU, and generate an output of a plurality of CPRI flows at a granularity switched by the cross-connect, e.g. 4×2.5G CPRI flows at the switch 52 output towards the cross-connect 31. If it is desired to switch a AxC block from a certain CPRI signal from a DU to a generic 2.5G CPRI flow, this is not possible since the CPRI cross connect 31 does not have the capability to switch at AxC granularity. In this case, the DU-DU connection 33 provides for exchange of AxC blocks between DUs.

Without introducing a specific mechanism, (e.g. acting at RRU and DU level), such option can reconfigure 2.5 Gbit/s CPRIs in the cross-connect only when no IQ data are passing on the involved links, since a temporary traffic disruption will occur due to loss of synchronization.

In this example, the cross-connect 31 and transport network 10 operates at 2.5 Gbit/s granularity. This allows CPRI data flows at 2.5 Gbit/s to be generated by the RRUs. The 2.5 Gbit/s CPRI flows are aggregated into higher rates signals at the RRU clusters prior to optical transmission to the central hub 30, using a proprietary switch 53. A data container, e.g. at 2.5 Gbps, is transmitted with the same structure and without re-arrangement from an RRU, though switch 53 (where it is aggregated with similar units), across the optical link, and switched by the cross-connect 31. The switched container may then have AxC sub-flows re-arranged and multiplexed by the switch 52, for transport to the DU. Alternatively, the switch 52 may operate in the same manner as the switch 50, and merely aggregate such containers without terminating AxC sub-flows.

From a DU, AxC sub-flows are transmitted to the switch 52, where they are terminated and a CPRI container generated (e.g. a 2.5 Gbps CPRI container). Alternatively, such container is generated by the DU. The cross-connect 31 receives such CPRI container, switches the CPRI container to the appropriate output for the RRU cluster, optionally considering the lambda on which the container should be transmitted. The CPRI container is switched by the switch 53 to the intended RRU. The switch 53 merely switches the containers received, without terminating the sub-flows within.

Data flows are exchanged between the remote radio unit and the digital unit. The data flows may relate to the transmitting and receiving of radio signals, within the time slots. In some examples, any of the electrical switches or multiplexers described, e.g. multiplexers/switches 41,51,53 are configured to time division multiplex/demultiplex.

Various examples of the invention illustrate a transport network configured to connect a plurality of remote radio units with a plurality of digital units in a radio access network. The transport network comprises an electronic cross-connect common to the plurality of remote radio units and digital units, and a control unit configured to control the electronic cross-connect. The transport network comprises an optical link between the electronic cross-connect and remote radio unit. The electronic cross-connect is a multi-layer switch (although in some examples, the cross-connect is a single layer switch). The electronic cross-connect is configured to switch data flows between one or more of said plurality of digital units and one or more of said plurality of remote radio units.

In some examples, the control unit is configured to control the cross-connect to switch at two or more of: lambda, CPRI, SAP and AxC granularity. A switch or multiplexer/demultiplexer (41;51;53) configured to communicate across the optical link with the electronic cross-connect, and is configured to switch or multiplex/demultiplex data flows relating to a plurality of remote radio units. The switch or multiplexer/demultiplexer is connected to the control unit and controlled by the control unit. In some aspects, the cross-connect, switch or multiplexer/demultiplexer is configured to multiplex data flows relating to a plurality of said remote radio units within an optical channel. In some aspects, the switch or multiplexer/demultiplexer is configured to operate at a same base granularity as the electronic cross-connect.

Figure 6A:
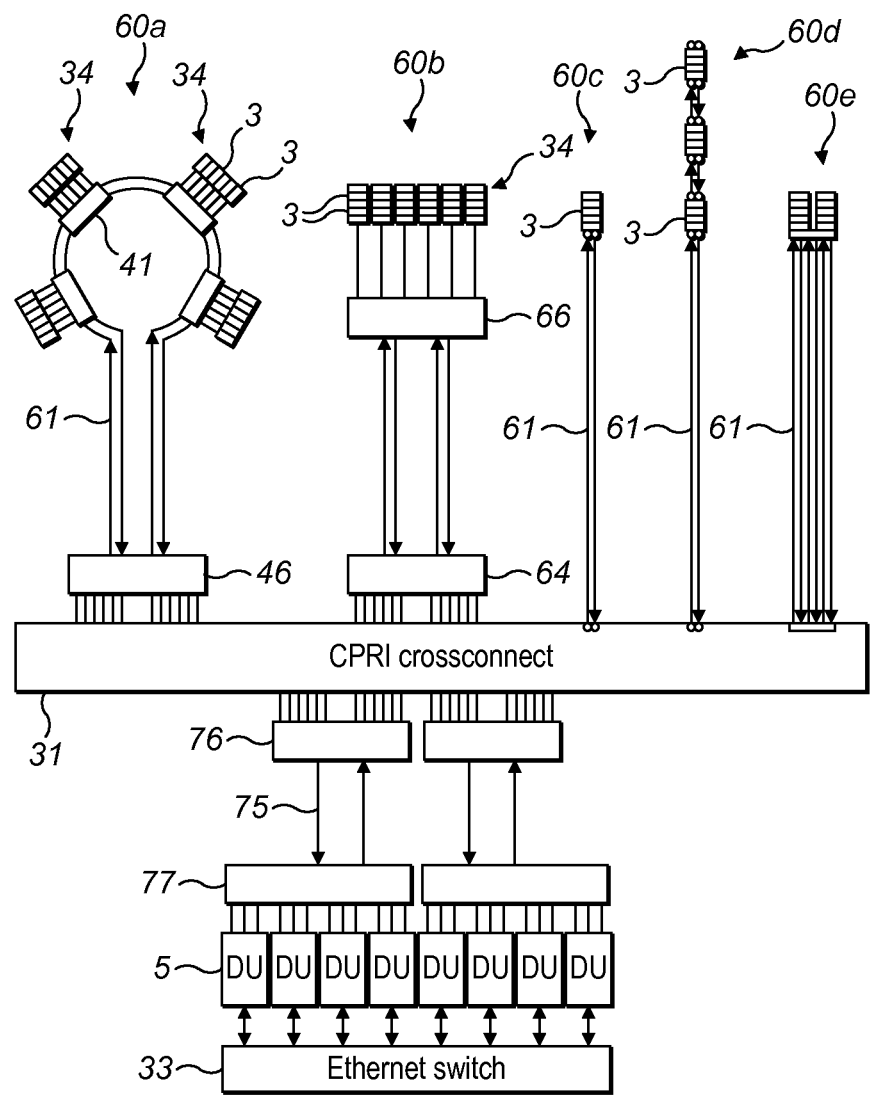
FIGS. 6a to 6c are schematic overviews of system according to the examples of the invention using different technologies and arrangements for optical networking.
Figure 6B:
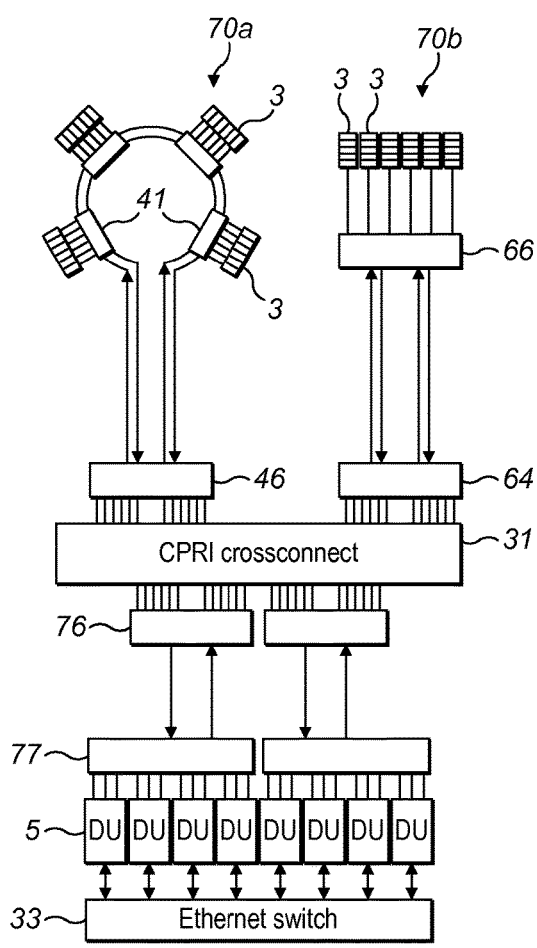
Figure 6C:
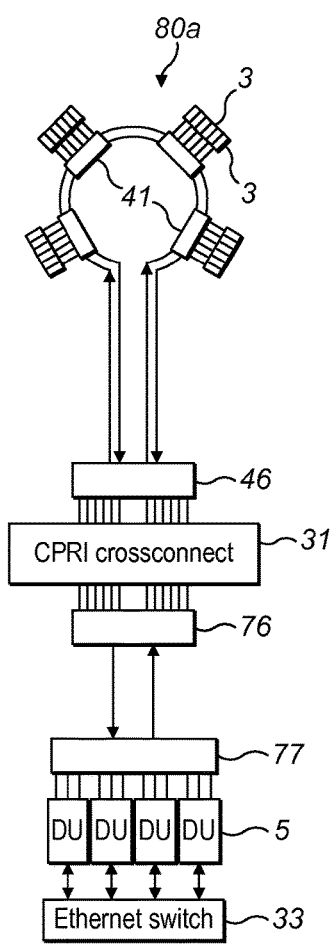

FIGS. 6a to 6c represent three possible implementations of aspects of the invention. FIG. 6a shows an implementation which is technically and/or commercially viable today. FIG. 6b shows an implementation which is expected to be commercially viable in approximately 2 to 3 years. FIG. 6c shows an implementation which is expected to be commercially viable in approximately 3 to 5 years. The principles of these implementations are already technically understood. For any implementation, the cross-connect 31 and central hub may be as described in any example.

FIG. 6a shows five different examples of RRU cluster 60a-60e, having different examples of transport network associated with the RRU cluster. These examples may be used separately or in any combination together.

In a first example of RRU cluster 60a, the optical connection 61 from the central hub is a WDM connection. The optical connection forms one or more rings to connect a plurality of sets of RRUs. The WDM connection 61 is distributed to each set of RRUs by optical add drop multiplexers 41 in the ring. The multiplexers 41 may in some examples electronically switch the extracted one or more wavelengths to the RRUs. This example corresponds to the example of FIG. 3. In the example of FIG. 6a, the WDM is a coarse WDM (CWDM).

The optical add-drop multiplexers for RRU cluster 60a may be of any type. For example, the optical add-drop multiplexers are fixed optical add-drop multiplexers (FOADM), reconfigurable optical add-drop multiplexers (ROADM) or mini-ROADM.

A FOADM (for example functioning as a wavelength fixed add/drop filter) may be located in each node serving a set of one or more RRUs, i.e. an RRU cluster. For example, a FOADM with different selected combinations of add/drop wavelength, depending on the wavelength planning, are used. This introduces a complex inventory handling. System capacity upgrade by adding or re-planning wavelengths requires unit replacement in field. Fixed Add/Drop Filters may be based on discrete passive optics. Different technologies of fixed add/drop filters may be used, for example: Fiber-Bragg Gratings, Thin Film filters.

A Mini-ROADM is a silicon photonics integrated device. This integrated device is reconfigurable. The mini-ROADM may be a simple optical switching device with a limited number of wavelengths (12 or maximum 24), and one input and one output port for network connection. It has the dimensions of a chip. The same device is used in all nodes. The mini-ROADM is an active device, and may be automatically reconfigured for protection without the need to duplicate the optical interfaces at each add/drop port. The mini-ROADM is reconfigurable electrically and the wavelengths in a ring can be re-planned or added without the need of manual replacement of the ROADM device in each optical node. This option simplifies also the inventory handling. Further details of the mini-ROADM may be found in co-pending applications PCT/EP2014/60621 or PCT/EP2013/068250.

In a further example, a ROADM is used instead of a FOADM or mini-ROADM.

The data flow is routed to the correct RRU attached to a ring by the selection of a particular wavelength at an output of the CPRI cross-connect, the particular wavelength associated with a particular RRU.

This wavelength is passed all the way to the RRU through the optical nodes, and is extracted by one node. The RRUs are connected to the OADM by optical connections.

In a second example of RRU cluster 60b, the optical connection from the central hub is a WDM connection. The optical connection forms a WDM point-to-point connection to a set of RRUs. A plurality of wavelengths from the central hub 30 are multiplexed/demultiplexed by the multiplexer/demultiplexer 64. A corresponding optical multiplexer/demultiplexer 66 is at the RRU clusters 34. The optical multiplexer/demultiplexer 64,66 provide for WDM transport of data flows between the central hub.

In some examples, the separated wavelengths are optically or electrically transmitted to a set of one or more RRUs. If necessary, a switch distributes the data flows to/from each of the RRUs 3.

The central hub associated with RRU clusters 60a and 60b may utilize either an optical multiplexer/demultiplexer or an optical add drop multiplexer.

The RRUs may be connected to the central hub using a grey interface or DWDM optics. For example, RRU clusters 60d,60e,60f are shown connected to the central hub 30 using a grey interface 61, also considered as a single optical signal in a point-to-point optical connection.

In some examples, transceivers at the central hub at the RRU site are small form-factor pluggable (SFP) transceivers. At the RRU site, the optical channel is converted to an electrical signal by the transceiver. In this example, there are four RRUs connected to the same optical connection. In some examples (block 60a and 60b only), a plurality of optical channels (wavelengths) are carried over the optical connection 61.

In the third example of RRU cluster 60c, a single optical channel connects the RRU cluster with the central hub 30. The RRU cluster 60d comprises a plurality of RRUs.

In the fourth example, a plurality of RRU clusters 60d are chained together. The example shown is a daisy chain. In this example, three RRU clusters 60d, each serving a plurality of RRUs, are chained together.

In the fifth example of RRU cluster 60e, transceivers at the central hub 30 and RRU site are in the form of integrated optical circuits, i.e. photonic integrated circuits (PICs). One or more optical channels transport the CPRI data flows to the RRUs, where the data flows are distributed to the RRUs. In some examples, the optical connection comprises parallel optical modules.

FIG. 6b shows examples of the transport network 10 implemented according to the example configurations as shown in FIG. 6a. For example, the RRU clusters 70a and 70b correspond to the examples of RRU clusters 60a and 60b respectively.

In the RRU clusters 70a and 70b, and the associated transport network 10, the WDM may be a dense WDM (DWDM). The optical add-drop multiplexers may be FOADMs. The optical add-drop multiplexers, multiplexers/demultiplexer or transceivers may use PIC or tunable laser (TL) technology.

The RRU cluster 70d comprises a plurality of OADM 41, functioning in a manner corresponding to the OADM described earlier. In this case, the WDM spacing and/or implementation technology may be different, as described above.

The RRU cluster 70b comprises the optical multiplexer/demultiplexer 66, functioning in a manner corresponding to the multiplexer/demultiplexer 66 described earlier. In this case, the WDM spacing and/or implementation technology may be different, as described above.

In FIG. 6c, the WDM may be a dense WDM (DWDM). The optical add-drop multiplexers 41,46 may be implemented using a mini-ROADM. The optical transceivers may use PIC or TL technology. A plurality of RRU clusters 80a has a corresponding structure to FIG. 2, and RRU clusters 60a and 70a in FIGS. 6a and 6b. In the example of RRU cluster 80a, the OADM 41 is implemented with a mini-ROADM, as described. In some examples, one or more further multiplexers 46,76,77 in the transport network 10 is also implemented with a mini-ROADM.

In any example of FIGS. 6a to 6c, the transport network 10 comprises an optical connection 75 between the central hub 30 and the DUs. As shown in FIGS. 6*a* to 6*c*, electro-optical converters provide an optical output from the CPRI cross-connect 31. The optical output is multiplexed by multiplexers 76 to provide a WDM signal. The multiplexers 76 are multiplexers/demultiplexers also configured to demultiplex WDM signals to the DUs, and provide an optical output to electro-optical converters to output an electrical signal to the cross-connect 31.

In the example shown, the transport network 10 comprises a plurality (e.g. two) DU pools, each associated with a multiplexer/demultiplexer 76.

The WDM signal is transported across one or more optical fibers to the DU pools. A further multiplexer/demultiplexer 77 for each DU pool is configured to multiplex/demultiplex optical signals for the DUs, prior to electro-optical conversion by transceivers at the DUs. In FIG. 6*a*, the multiplexers/demultiplexers 76,77 function for Coarse Wavelength Division Multiplexing (CWDM). The optical transceivers are SFP modules.

In FIGS. 6*b* and 6*c*, the multiplexers/demultiplexers 76,77 function for DWDM. In FIGS. 6*b* and 6*c*, the transceivers may be implemented by PICs.

In FIG. 6*c*, the multiplexer/demultiplexer 76,77 are implemented as a mini-ROADM. In this example, there is only one DU pool and associated multiplexer/demultiplexer 76,77.

Figure 8:
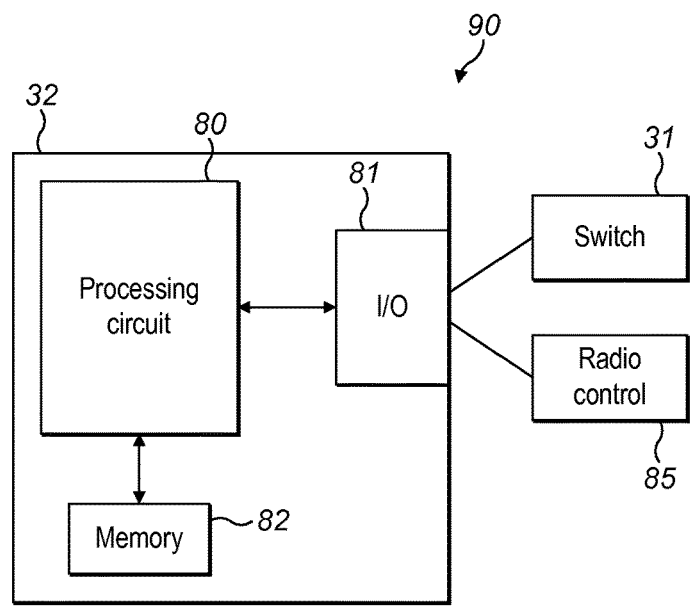
FIG. 8 is a schematic illustration of a part of the system according to an aspect of the invention.

FIG. 8 shows an example implementation of the control unit 32 within a transport network 10. The transport network 10 comprises the electronic cross-connect 31, control unit 32 and the multiplexers/switches at the central hub 30 and at the location of the RRUs and DUs. In some aspects, the transport network 10 optionally further comprises the DUs 5 and/or RRUs 3.

In some examples, the control unit 32 comprises a processing circuit 80, together with computer program code for performing the functions and/or method steps of the embodiments herein. An input/output unit 81 is connected to the processing unit in order to transmit commands to the electronic cross-connect 31, and optionally also the multiplexers/switches at the central hub 30 and at the location of the RRUs and DUs of any example. In some examples, the input/output unit 81 may also receive information from a OSS, radio control 85 or management entity. A memory 82 is also connected to the processing circuit 80, for operation of the processing circuit 80 and/or storing the current configuration of the cross-connect or switch and any other parameters or data needed.

The program code mentioned above may also be provided as a computer program product, for instance in the form of a data carrier carrying computer program code for performing embodiments herein when being loaded into the control unit 32. One such carrier may be in the form of a CD ROM disc. It is however feasible with other data carriers such as a memory stick. The computer program code may furthermore be provided as pure program code on a server and downloaded to the control unit 32.

In some examples, one or more multiplexer is configured to multiplex a plurality of the data flows on a single optical wavelength and/or multiplex a plurality of optical wavelengths comprising data flows. The data flows are for/from a plurality of RRUs.

In some examples, any of the cross-connect, multiplexer or switch may comprise a processing circuit and an input and output unit configured to receive commands from the control unit and carry out the functions described above.

Those skilled in the art will also appreciate that various "circuits" described may refer to a combination of analog and digital circuits, and/or one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Figure 9:
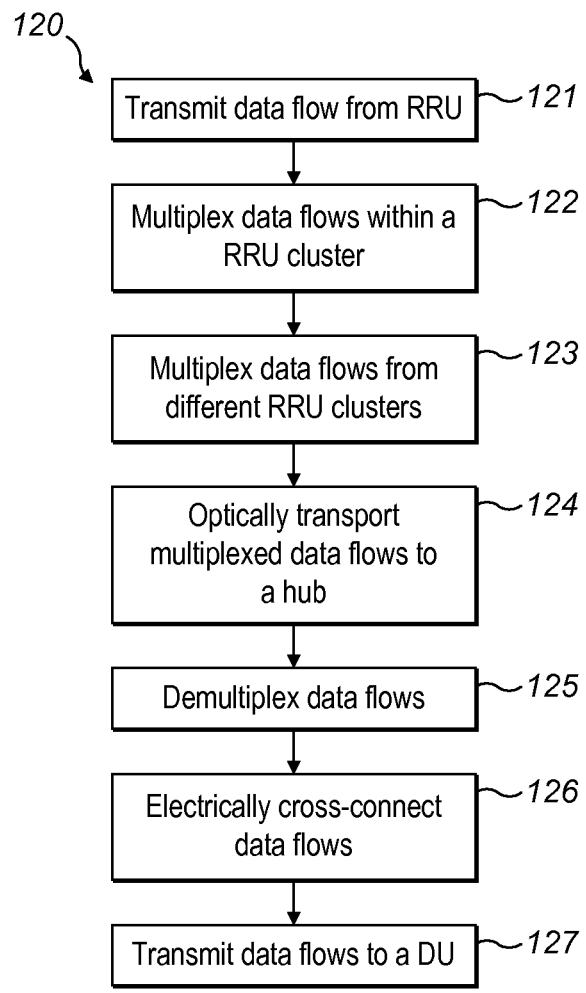
FIG. 9 is a schematic flowchart illustrating an example method of an aspect of the invention.

FIG. 9 illustrates an example method 120 of operating the transport network shown in the example of FIG. 3.

In 121, a data flow is transmitted from a RRU to a switch 41. The switch 41 is at the RRU site. The switch 41 also receive a data flow from one or more further RRUs 3 within a RRU cluster 34.

In 122, the data flows from RRUs of a RRU cluster 34 are multiplexed by the switch 41. The multiplexing may be optical multiplexing of optical channels and/or electronic multiplexing within an optical channel.

In 123, optionally data flows from different RRU clusters 34 are multiplexed. For example, optical channels from a plurality of RRU clusters are wavelength division multiplexed together, e.g. by the switch 41.

In 124, the multiplexed data flows are optically transported to the central hub 30. The optical transport may be over a geographic distance.

In 125, at the central hub 30, the multiplexed data flows are demultiplexed, e.g. by demultiplexer 46.

In 126, the demultiplexed data flows are electrically cross-connected at the hub 30, i.e. by electronic cross-connect 31. The cross-connect 31 connects a determined RRU with a determined DU, under the control of control unit 32.

In 127, the switched data flows are transmitted to a DU.

Data flows are also transmitted from a DU to a RRU. In this case, the above method is carried out in reverse, and references to multiplexing and demultiplexing are reversed.

Figure 10:
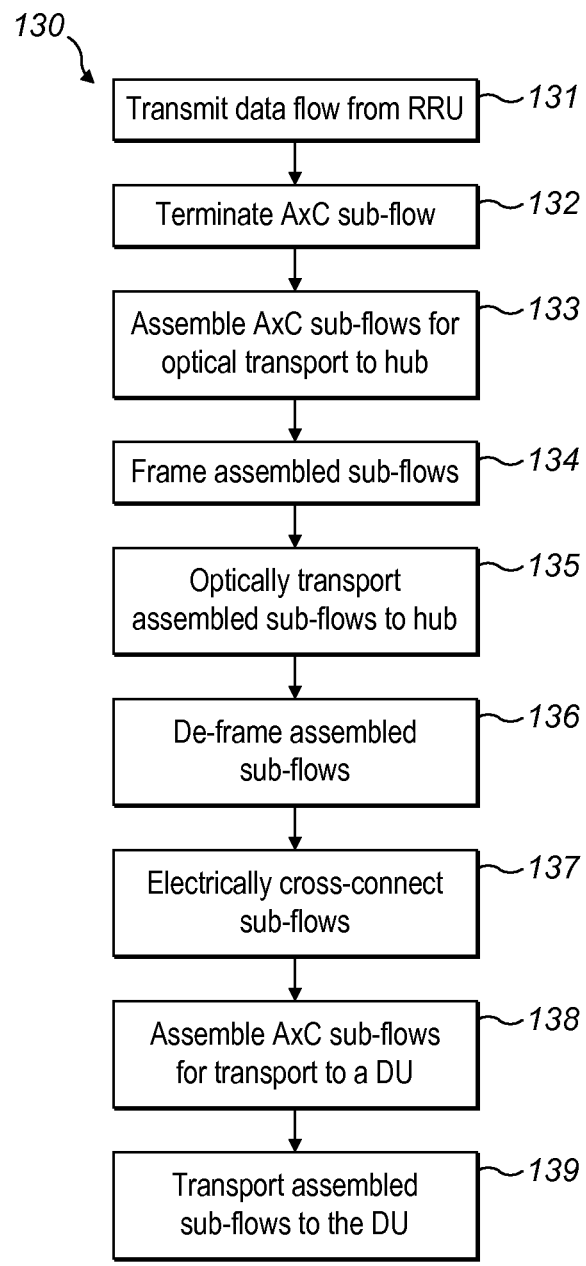
FIG. 10 is a schematic flowchart illustrating an example method of an aspect of the invention.

FIG. 10 illustrates an example method 130 of operating the transport network shown in the example of FIG. 4.

In 131, a data flow is transmitted from a RRU to a switch 51. The switch 51 is at the RRU site. The switch 51 also receive a data flow from one or more further RRUs 3 within a RRU cluster 34.

In 132, AxC sub-flows from the data flows are terminated by the switch 51.

In 133, the AxC sub-flows are assembled (aggregated) for optical transport by the switch 51. The assembled AxC sub-flows are from a plurality of RRUs 34 of a RRU cluster 34. A plurality of sub-flows for different RRUs may be aggregated on a single optical channel.

In 134, optionally the assembled sub-flows are framed with a FEC and/or O&M data, by framer 48.

In 135, the assembled sub-flows are optically transported to the central hub 30. The optical transport may be over a geographic distance.

In 136, at the central hub 30, the multiplexed data flows are de-framed, if necessary, by de-framer 49.

In 137, the sub-flows are electrically cross-connected at the hub 30, i.e. by electronic cross-connect 31. The cross-connect 31 connects a determined RRU with a determined DU, under the control of control unit 32. The cross-connect 31 may operate at AxC granularity.

In 138, the switched AxC sub-flows are aggregated by the cross-connect 31.

In 139, the aggregated AxC sub-flows are transmitted to a DU.

Data flows are also transmitted from a DU to a RRU. In this case, the above method is carried out in reverse, and references to e.g. aggregating, multiplexing/demultiplexing and framing/de-framing are reversed.

Figure 11:
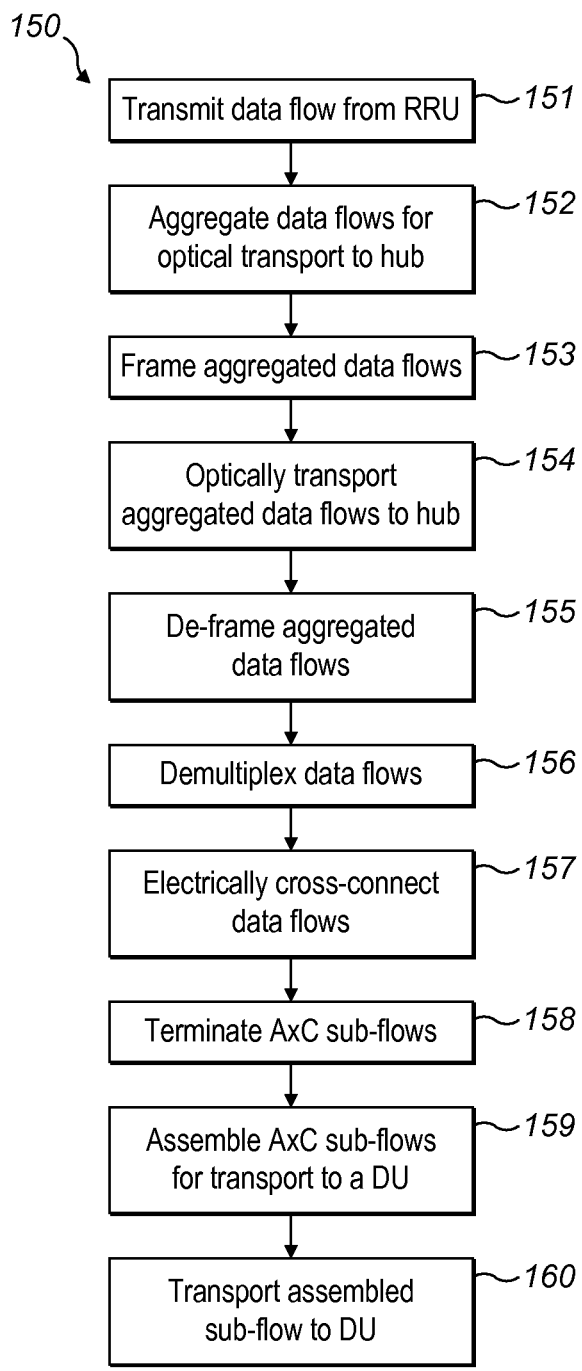
FIG. 11 is a schematic flowchart illustrating an example method of an aspect of the invention.

FIG. 11 illustrates an example method 150 of operating the transport network shown in the example of FIG. 5.

In 151, a data flow is transmitted from a RRU to a switch 53. The switch 53 is at the RRU site. The switch 53 also receive a data flow from one or more further RRUs 3 within a RRU cluster 34.

In 152, the received data flows are aggregated for optical transport by the switch 53. The aggregated data flows are from a plurality of RRUs 34 of a RRU cluster 34. A plurality of data flows may be aggregated on a single optical channel. The switch 53 does not terminate AxC sub-flows. The aggregation is by assembling the lower rate CPRI data flows, without changing the structure or contents of those lower rate CPRI data flows.

In 153, optionally the aggregated data flows are framed with a FEC and/or O&M data, by framer 48.

In 154, the assembled data flows are optically transported to the central hub 30. The optical transport may be over a geographic distance.

In 155, at the central hub 30, the multiplexed data flows are de-framed, if necessary, by de-framer 49.

In 156, the data flows are demultiplexed by de-multiplexer 50.

In 157, the data flows are electrically cross-connected at the hub 30, i.e. by electronic cross-connect 31. The cross-connect 31 connects a determined RRU with a determined DU, under the control of control unit 32. The cross-connect 31 may operate at the same granularity as generated by the RRU, e.g. 2.5 Gbps.

In 158, AxC sub-flows from the switched data flows are terminated by the switch 52.

In 159, the AxC sub-flows are assembled (aggregated) for transport by the switch 52. A plurality of sub-flows may be aggregated on a single optical channel.

In 160, the aggregated AxC sub-flows are transmitted to a DU.

Data flows are also transmitted from a DU to a RRU. In this case, the above method is carried out in reverse, and references to e.g. aggregating, multiplexing/demultiplexing and framing/de-framing are reversed.

Aspects of the arrangement of the transport network 10 may provide one or more of the following features:

Multiple DUs may process sub-flows coming from a given RRU. This enables DU pooling for load sharing purposes.

By enabling dynamic swap among a given RRU and the associated DU(s), it is possible to consolidate baseband processing on a reduced number of DUs. This allows to temporarily switch off of unused DUs, and thus save energy.

Failure recovery is provided by the possibility to dispatch affected traffic towards multiple DUs having, concurrently, enough baseband processing capabilities.

Capability to dynamically re-arrange the physical connectivity among DU and RRU. This is done whilst keeping the DU and RRU unaware of the underlying physical network. For example, this is due to a combined use of a smart control unit operating at different granularity (e.g. from SAP to wavelength) and suitable network transport. A connection of RRUs and DUSs is strictly non-blocking.

Capability to transport of CPRI over geographical distances, at different granularities from AxC level to 10 Gbit/s.

Light CPRI encapsulation with FEC and O&M functionalities, to cover wide areas.

Minimization of geographical cabling, by aggregating CPRI streams in optical channels.

The possibility to change which DU processes the traffic coming from a given RRU, reduce or even make unnecessary the inter-DU communication. This allows a simplification of the inter-DU local cabling.

Re-association RRU-DU can be done preserving synchronization during reconfiguration phase ("hot" swap).

Compatibility with different topological options, also to exploit existing infrastructures.

Complete scalability. For example, in case of WDM rings, it's possible to add more RRUs by increasing the number of rings and increase the hub capacity. This enables a pay-as-you-grow commercial approach.

Multiple technological options with a smooth migration from current technologies towards a future one.

No wavelength assignment constraints because the hub is based on an electrical switch with OEO converters.

Reuse of wavelengths, allowing the utilization of simple low cost optical devices.

Control unit operating on the input provided by external radio control/management entities or autonomously.

Recovery to single link failures with possible reduction of over-provisioning.

Recovery to hub failure.

Support of multi-operator scenario.

Backward compatibility with installed base.

Scalability, both in terms of number of access points and in terms of traffic amount, is provided.

Resiliency, at least to a single failure, may be implemented.

Back-compatibility may be provided for a smooth migration, e.g. in brownfield scenarios.

Any example of the invention may be combined with any other example. Any feature may be considered independently of any other feature. For example, the features relating to transport between the RRUs and central hub may be independent of any features relating to transport between the DUs and central hub.

Some examples of the invention relate to a switch or electronic cross-connect for a fronthaul transport network, as described in any embodiment.

The invention claimed is:

1. A transport network configured to connect a plurality of remote radio units with a plurality of digital units in a radio access network, the transport network comprising:
an electronic cross-connect common to the plurality of remote radio units (RRUs) and digital units,
a control unit configured to control the electronic cross-connect;
an optical link between the electronic cross-connect and remote radio units, wherein the electronic cross-connect is a multi-layer switch,
the electronic cross-connect is configured to switch data flows between one or more of said plurality of digital units and one or more of said plurality of remote radio units;
wherein the transport network is further configured to change a connection of said remote radio unit from an original one of the digital units to a target one of the digital units, wherein the electronic cross-connect is further configured to multicast the data flow from said remote radio unit to said original one of the digital units and said target one of the digital units, and said target digital unit is configured to align frames with said original digital unit, and when alignment has been completed, the switch is configured to discontinue communication between the original digital unit and the remote radio unit.

2. The transport network of claim 1, wherein the control unit is configured to control the cross-connect to switch at two or more of: lambda, Common Public Radio Interface (CPRI), Service Access Point (SAP), Antenna-Carrier (AxC) layers.

3. The transport network of claim 1, further comprising a switch or multiplexer/demultiplexer configured to communicate across the optical link with the electronic cross-connect, wherein the switch is configured to switch or multiplex/demultiplex data flows relating to a plurality of remote radio units, and wherein the switch or multiplexer/demultiplexer is connected to the control unit and controlled by the control unit.

4. The transport network of claim 3, wherein the cross-connect, switch or multiplexer/demultiplexer is configured to multiplex data flows relating to a plurality of said remote radio units within an optical channel.

5. The transport network of claim 3, wherein the switch or multiplexer/demultiplexer is configured to operate at a same base granularity as the electronic cross-connect.

6. The transport network of claim 3, wherein the switch is configured to terminate AxC sub-flows received from the electronic cross-connect over the optical ink.

7. The transport network of claim 3, wherein the switch is configured to reassemble the sub-flows onto a signal to be delivered to individual ones of the plurality of RRUs.

8. The transport network of claim 1, wherein the electronic cross-connect is configured to directly switch data flows transported by the optical link between remote radio units and digital units.

9. The transport network of claim 1, wherein the electronic cross-connect is configured to switch without terminating AxC sub-flows.

10. The transport network of claim 1, further comprising a multiplexer/demultiplexer configured to communicate across the optical link with the remote radio units and/or a switch configured to communicate across the optical link with the electronic cross-connect;

wherein the multiplexer/demultiplexer and/or switch is configured to aggregate a plurality of lower rate signals by maintaining an arrangement of data within each lower rate signal and/or without terminating AxC sub-flows.

11. The transport network of claim 1, further comprising one or more multiplexer/demultiplexer configured to multiplex a plurality of optical wavelengths for transport over the optical link towards the electronic cross-connect, wherein the plurality of wavelengths are associated with one or more remote radio units.

12. The transport network of claim 11, wherein the multiplexer/demultiplexer is an optical add-drop multiplexer, wherein the optical add-drop multiplexer is configured to add or drop optical wavelengths associated with one or more connected remote radio units.

13. The transport network of claim 1, wherein the optical link between the electronic cross-connect and remote radio units comprises a ring to which one or more remote radio units are connected.

14. The transport network of claim 1, wherein the electronic cross-connect is configured to re-map a time slot of a data flow, such that the data flow received by the remote radio unit from the original and target digital units are in the same time slot.

15. A method for operating a transport network configured to connect a plurality of remote radio units with a plurality of digital units in a radio access network, the method comprising:

controlling an electronic cross-connect common to the plurality of remote radio units (RRUs) and digital units, transmitting data flows on an optical link between the electronic cross-connect and remote radio units, wherein the electronic cross-connect is a multi-layer switch, the electronic cross-connect switches data flows between one or more of said plurality of digital units and one or more of said plurality of remote radio units; and changing a connection of a remote radio unit from an original digital unit to a target digital unit, the electronic cross-connect multicasting the data flow from the remote radio unit to the original digital unit and the target digital unit, and aligning frames of the target digital unit with the original digital unit, and when alignment has been completed, discontinuing communication between the original digital unit and the remote radio unit.

16. The method of claim 15, wherein the control unit controls the cross-connect to switch at two or more of: lambda, Common Public Radio Interface (CPRI), Service Access Point (SAP), Antenna-Carrier (AxC) layers.

17. The method of claim 15, further comprising switching or multiplexing/demultiplexing with a switch or multiplexer/demultiplexer to communicate across the optical link with the electronic cross-connect, and the switching or multiplexing/demultiplexing is of data flows relating to a plurality of remote radio units, controlling the switching or multiplexing/demultiplexing with the control unit.

18. The method of claim 17, wherein the cross-connect, switch or multiplexer/demultiplexer multiplexes data flows relating to a plurality of said remote radio units within an optical channel.

19. The method of claim 17, wherein the switch or multiplexer/demultiplexer operates at a same base granularity as the electronic cross-connect.

20. The method of claim 17, wherein the switch is configured to terminate AxC sub-flows received from the electronic cross-connect over the optical ink.

21. The method of claim 17, wherein the switch is configured to reassemble the sub-flows onto a signal to be delivered to individual ones of the plurality of RRUs.

22. The method of claim 15, wherein the electronic cross-connect directly switches data flows transported by the optical link between remote radio units and digital units.

23. The method of claim 15, wherein the electronic cross-connect switches without terminating AxC sub-flows.

24. The method of claim 15, comprising multiplexing/demultiplexing using a multiplexer/demultiplexer to communicate across the optical link with the remote radio units and/or a switching using a switch to communicate across the optical link with the electronic cross-connect;

wherein the multiplexer/demultiplexer and/or switch aggregates a plurality of lower rate signals by maintaining an arrangement of data within each lower rate signal and/or without terminating AxC sub-flows.

25. The method of claim 15, comprising multiplexing a plurality of optical wavelengths for transport over the optical link towards the electronic cross-connect, wherein the plurality of wavelengths are associated with one or more remote radio units.

26. The method of claim 25, wherein the multiplexing/demultiplexing is by an optical add-drop multiplexer, wherein the optical add-drop multiplexer adds or drops optical wavelengths associated with one or more connected remote radio units.

27. The method of claim 15, wherein the optical link between the electronic cross-connect and remote radio units comprises a ring to which one or more remote radio units are connected.

28. The method of claim 15, wherein the electronic cross-connect re-maps a time slot of a data flow, such that the data flow received by the remote radio unit from the original and target digital units are in the same time slot.

29. A transport network configured to connect a plurality of remote radio units with a plurality of digital units in a radio access network, and configured to change a connection of a said remote radio unit from an original one of the digital units to a target one of the digital units, the transport network comprising:
an electronic cross-connect configured to multicast a data flow from a said remote radio unit to the original one of the digital units and the target one of the digital units, wherein the target digital unit is configured to align frames with the original digital unit, and
a switch configured to, when alignment has been completed, discontinue communication between the original digital unit and the remote radio unit.

30. The transport network of claim 29, wherein the electronic cross-connect is configured to re-map a time slot of a data flow, such that the data flow received by the remote radio unit from the original and target digital unit are in the same time slot.

31. The transport network of claim 29, wherein the original digital unit and target digital unit are configured to send frames to the electronic cross-connect, during a transitional period.

32. A method for operating a transport network configured to connect a plurality of remote radio units with a plurality of digital units in a radio access network, comprising changing a connection of a remote radio unit from an original digital unit to a target digital unit, the method comprising:
multicasting a data flow from the remote radio unit to the original digital unit and the target digital unit, using an electronic cross-connect; and
aligning frames of the target digital unit with the original digital unit; and
when alignment has been completed, discontinuing communication between the original digital unit and the remote radio unit.

33. The method of claim 32, wherein the electronic cross-connect re-maps a time slot of a data flow, such that the data flow received by the remote radio unit from the original and target digital units are in the same time slot.

34. The method of claim 33, wherein the original digital unit and target digital unit send frames to the electronic cross-connect, during a transitional period.

35. A system in a radio access network comprising:
a plurality of remote radio units,
a plurality of digital units, and
a transport network connecting the plurality of remote radio units and plurality of digital units, the transport network comprising:
an electronic cross-connect common to the plurality of remote radio units and digital units,
a control unit configured to control the electronic cross-connect;
an optical link between the electronic cross-connect and remote radio units, wherein the electronic cross-connect is a multi-layer switch, and
the electronic cross-connect is configured to switch data flows between one or more of said plurality of digital units and one or more of said plurality of remote radio units;
wherein the transport network is configured to change a connection of said remote radio unit from an original one of the digital units to a target one of the digital units,
wherein the electronic cross-connect is further configured to multicast a data flow from said remote radio unit to said original one of the digital units and said target one of the digital units, and
said target digital unit is configured to align frames with said original digital unit, and when alignment has been completed, the switch is configured to discontinue communication between the original digital unit and the remote radio unit (RRU).

36. An electronic cross-connect configured to connect a plurality of remote radio units with a plurality of digital units in a radio access network,
wherein the electronic cross-connect is a multi-layer switch, and
the electronic cross-connect is configured to switch data flows between one or more of said plurality of digital units and one or more of said plurality of remote radio units; and
wherein the electronic cross-connect is further configured to multicast a data flow from said remote radio unit to an original one of the digital units and a target one of the digital units, and
said target digital unit is configured to align frames with said original digital unit, and when alignment has been completed, a switch is configured to discontinue communication between the original digital unit and the remote radio unit.

37. The electronic cross-connect of claim 36, wherein the electronic cross-connect directly switches data flows transported by an optical link between remote radio units and digital units.

* * * * *